(12) United States Patent
Kawabata et al.

(10) Patent No.: US 10,773,276 B2
(45) Date of Patent: Sep. 15, 2020

(54) METHOD FOR FORMING MULTILAYER COATING FILM

(71) Applicants: NIPPON PAINT AUTOMOTIVE COATINGS CO., LTD., Hirakata-shi, Osaka (JP); TOYOTA JIDOSHA KABUSHIKI KAISHA, Toyota-shi, Aichi (JP)

(72) Inventors: Takayuki Kawabata, Hirakata (JP); Akira Yamazaki, Hirakata (JP); Masako Hase, Toyota (JP); Keiji Ambo, Miyoshi (JP); Yoshinori Narita, Toyota (JP)

(73) Assignees: NIPPON PAINT AUTOMOTIVE COATINGS CO., LTD., Hirakata-shi, Osaka (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 42 days.

(21) Appl. No.: 15/939,812

(22) Filed: Mar. 29, 2018

(65) Prior Publication Data

US 2018/0281019 A1   Oct. 4, 2018

(30) Foreign Application Priority Data

Mar. 31, 2017   (JP) ................. 2017-072427

(51) Int. Cl.
| | |
|---|---|
| *B05D 7/00* | (2006.01) |
| *B05D 3/02* | (2006.01) |
| *C09D 133/10* | (2006.01) |
| *B05D 3/00* | (2006.01) |
| *C09D 5/02* | (2006.01) |
| *C09D 133/08* | (2006.01) |
| *C09D 133/06* | (2006.01) |
| *C25D 13/14* | (2006.01) |
| *B05D 7/14* | (2006.01) |
| *C25D 13/12* | (2006.01) |

(52) U.S. Cl.
CPC .............. *B05D 7/572* (2013.01); *B05D 3/002* (2013.01); *B05D 3/007* (2013.01); *B05D 3/0254* (2013.01); *B05D 7/574* (2013.01); *C09D 5/022* (2013.01); *C09D 133/066* (2013.01); *C09D 133/08* (2013.01); *C09D 133/10* (2013.01); *B05D 7/14* (2013.01); *C25D 13/12* (2013.01); *C25D 13/14* (2013.01)

(58) Field of Classification Search
CPC ........ B05D 7/572; B05D 3/002; B05D 3/007; B05D 3/0254; B05D 1/36; B05D 7/14; C09D 5/022; C09D 133/08; C09D 133/10; C09D 175/04; C09D 5/002; C09D 133/066; C09D 133/14; C09D 151/06; C09D 5/36; C25D 13/14; C08G 18/0823; C08G 18/755; C08G 18/6266; C08G 18/423; C08G 18/12; C08G 18/758; C08G 18/6659; C08G 18/302; C08G 18/4238; C08G 18/4277; C08G 18/44; C08G 18/80; C08G 18/6254; C08F 220/281; C08F 220/1808; C08F 220/1804; C08F 220/06; C08F 220/14; C08F 220/40; C08F 212/08; Y10T 428/31504; Y10T 428/265; C08L 2666/20; C08L 2312/00
See application file for complete search history.

(56) References Cited

U.S. PATENT DOCUMENTS

| | | | |
|---|---|---|---|
| 5,741,552 | A | 4/1998 | Takayama et al. |
| 6,395,340 | B1 | 5/2002 | Wada et al. |
| 6,863,929 | B2 | 3/2005 | Watanabe et al. |
| 9,376,574 | B2 | 6/2016 | Hayashi et al. |
| 9,630,212 | B2 | 4/2017 | Tsukamoto et al. |
| 2003/0102217 | A1 | 6/2003 | Kasahara et al. |
| 2003/0158321 | A1 | 8/2003 | Watanabe et al. |
| 2005/0256252 | A1 | 11/2005 | Williams |
| 2006/0045965 | A1 | 3/2006 | Lin |
| 2006/0121204 | A1 | 6/2006 | Nakae et al. |

(Continued)

FOREIGN PATENT DOCUMENTS

| | | |
|---|---|---|
| CN | 101772382 A | 7/2010 |
| CN | 102076427 A | 5/2011 |

(Continued)

OTHER PUBLICATIONS

Office Action dated Dec. 5, 2018 in U.S. Appl. No. 15/895,151.

(Continued)

*Primary Examiner* — Xiuyu Tai
(74) *Attorney, Agent, or Firm* — Sughrue Mion, PLLC

(57) ABSTRACT

The coating film formed on an automobile body has softness during a film formation even on a thermally expandable/shrinkable base, and the cured film has an excellent appearance.

Provided is a method for forming a multilayer coating film, the method comprises: applying an aqueous intermediate coating composition and preheating the applied composition at 60 to 90° C. to form an uncured film;

preheating to form an uncured base coating film and a clear coating film; and baking and curing these uncured films to form a multilayer coating film, wherein the aqueous intermediate coating composition comprises (a) an acrylic resin emulsion having a specific properties, and (b) a film formation auxiliary agent that is a fatty acid diester compound having a boiling point of 280° C. to 350° C., and a cured film comprising (a) and (b) at a mass ratio of 3:1 has a rupture elongation of 1% or more.

2 Claims, No Drawings

(56) References Cited

U.S. PATENT DOCUMENTS

| | | | |
|---|---|---|---|
| 2006/0188656 A1* | 8/2006 | Katsuta | C09D 133/14 427/407.1 |
| 2008/0226891 A1 | 9/2008 | Chiga et al. | |
| 2009/0087667 A1 | 4/2009 | Tomizaki et al. | |
| 2009/0274846 A1 | 11/2009 | Wada et al. | |
| 2011/0045192 A1 | 2/2011 | Nakashima et al. | |
| 2011/0108426 A1 | 5/2011 | Hayashi et al. | |
| 2011/0111242 A1 | 5/2011 | Tomizaki et al. | |
| 2012/0045585 A1 | 2/2012 | Tsukamoto et al. | |
| 2013/0089731 A1* | 4/2013 | Imanaka | B05D 7/14 428/336 |
| 2014/0096701 A1 | 4/2014 | Santos et al. | |
| 2014/0312542 A1* | 10/2014 | Takata | C09J 7/35 267/141 |
| 2015/0004401 A1 | 1/2015 | Kojima et al. | |
| 2016/0083617 A1 | 3/2016 | Koyama et al. | |
| 2017/0252776 A1 | 9/2017 | Nakata et al. | |
| 2018/0230326 A1 | 8/2018 | Hase et al. | |

FOREIGN PATENT DOCUMENTS

| | | | |
|---|---|---|---|
| CN | 104136135 A | 11/2014 | |
| CN | 105121037 A | 12/2015 | |
| JP | 10-337531 A | 12/1998 | |
| JP | 2003-211085 A | 7/2003 | |
| JP | 2006-239535 A | 9/2006 | |
| JP | 2009-262001 A | 11/2009 | |
| JP | 2010-253378 A | 11/2010 | |
| JP | 2017-154089 A | 9/2017 | |
| WO | 2005/075587 A1 | 8/2005 | |

OTHER PUBLICATIONS

Office Action dated May 21, 2019 in U.S. Appl. No. 15/895,151.
Office Action dated Nov. 27, 2019 in U.S. Appl. No. 15/895,151.
Communication dated Sep. 17, 2019 issued by the State Intellectual Property Office of P.R. China in Chinese Application No. 201810145228.8.
TransportWrap, http://www.transportwrap.com/faq/html, Retrieved on May 15, 2019, Posted on Mar. 14, 2007 (Year: 2007).
Advisory Action dated Sep. 9, 2019 in U.S. Appl. No. 15/895,151.
Notice of Allowance dated May 8, 2020, from the United States Patent and Trademark Office in U.S. Appl. No. 15/895,151.
Corrected Notice of Allowability dated Jun. 9, 2020 by the USPTO in U.S. Appl. No. 15/895,151.

* cited by examiner

METHOD FOR FORMING MULTILAYER COATING FILM

TECHNICAL FIELD

The present disclosure relates to a method for forming a multilayer coating film, and particularly to a method for forming a multilayer coating film including an intermediate coating film, a base coating film and a clear coating film on an automobile body. The method including: applying a specific intermediate coating composition to an automobile body, and preheating the intermediate coating composition to form an uncured intermediate coating film; and applying an aqueous base coating composition onto the uncured intermediate coating film, and preheating the aqueous base coating composition to form an uncured base coating film.

BACKGROUND OF THE INVENTION

For example, formation of a multilayer coating film on an object to be coated, such as an automobile body, is performed basically by sequentially forming an intermediate coating film, a base coating film and a clear coating film on a steel sheet which is an object to be coated. Heretofore, these coating films have been each formed by applying a coating composition with a composition adjusted according to the function of the coating film, and baking and curing each of the applied coating compositions.

Unless an underlying layer is completely formed and smoothed when a plurality of coating compositions are applied one after another, adjacent coating film layers interfere with each other, so that irregularities of the underlying layer are reflected on the upper layer, leading to deterioration of the appearance of the multilayer coating film.

However, for improving work efficiency, and particularly realizing energy saving which has been highly required in recent years, a method for forming a multilayer coating film, which includes applying a plurality of coating compositions one after another in an uncured state, and then curing these coating compositions at a time, For example, a three-coating and one-baking method including the step of baking and curing an intermediate coating composition, a base coating composition and a clear coating composition at a time has been progressively employed.

In addition, in a coating method such as a three-coating and one-baking method in which a coating composition is continuously applied in an uncured state, the coating film appearance is markedly deteriorated if sagging occurs during application of an intermediate coating composition that is applied first, and therefore a technique for preventing sagging during application of an intermediate coating composition has been required.

Japanese Patent Laid-open Publication No. 2009-262001 discloses a method for forming a multilayer coating film having an excellent coating film appearance by controlling not only the viscosity of an intermediate coating composition but also the ratio of the hydrophilic property and the hydrophobic property of a resin to be used in the intermediate coating composition in a three-coating and one-baking method, so that sagging during application of the intermediate coating composition is effectively prevented.

SUMMARY OF THE INVENTION

The content of JP Patent Application No. 2017-072427 filed on Mar. 31, 2017 is incorporated by reference.

According to the method for forming a multilayer coating film, which is disclosed in Japanese Patent Laid-open Publication No. 2009-262001, sagging during application of the intermediate coating composition can be effectively prevented. However, a technique is still required for more stably forming a smooth coating film surface.

For example, in recent years, for providing an excellent coating film appearance, an uncured intermediate coating film has been formed by applying an intermediate coating composition, and then preheating the intermediate coating composition at a predetermined temperature.

However, for example, even with the intermediate coating composition disclosed in Japanese Patent Laid-open Publication No. 2009-262001, it is not possible to form a smooth coating film on a thermally expandable/shrinkable base by preheating the coating composition, and thus coating film defects such as creases and cracks may be generated.

The present disclosure solves the above-described problems of conventional techniques, and provides a method for forming a multilayer coating film, the method being capable of forming a smooth coating film even on a thermally expandable/shrinkable base when a multilayer coating film including an intermediate coating film, a base coating film and a clear coating film is formed on an automobile body provided with an electrodeposition coating film in a three-coating and one-baking method.

For achieving the above-described object, the present disclosure provides the following embodiments.

[1] A method for forming a multilayer coating film on an automobile body, the method comprising the steps of:
providing an automobile body provided with an electrodeposition coating film; applying an aqueous intermediate coating composition onto the electrodeposition coating film; preheating the applied aqueous intermediate coating composition at 60 to 90° C. for 3 to 10 minutes to form an uncured intermediate coating film;
applying an aqueous base coating composition onto the uncured intermediate coating film;
preheating the applied aqueous base coating composition at 60 to 90° C. for 3 to 10 minutes to form an uncured base coating film;
applying a clear coating composition onto the uncured base coating film to form an uncured clear coating film; and
baking and curing the uncured intermediate coating film, base coating film and clear coating film at a time to form a multilayer coating film,
wherein the aqueous intermediate coating composition comprises a coating film forming resin, the coating film forming resin comprises (a) an acrylic resin emulsion having a glass transition temperature of −50 to 20° C., an acid value of 2 to 60 mg KOH/g and a hydroxyl value of 10 to 120 mg KOH/g, the resin solid content of the (a) acrylic resin emulsion is 20 to 50 parts by mass based on 100 parts by mass of the total resin content of the coating film forming resin, the aqueous intermediate coating composition comprises (b) a film formation auxiliary agent that is a fatty acid diester compound having a boiling point of 280° C. or higher and 350° C. or lower, wherein a blending amount of the (b) film formation auxiliary agent is 2 to 30 parts by mass based on 100 parts by mass of the total resin solid content of the coating film forming resin, and wherein a cured film has a rupture elongation of 1% or more, wherein the cured film is obtained from a mixture containing the (a) acrylic resin emulsion and the (b) film formation auxiliary agent at a ratio of 3:1 in terms of a mass ratio of the solid content of the (a) acrylic resin emulsion and the (b) film formation auxiliary agent.

[2] The method for forming a multilayer coating film according to [1], wherein the automobile body is an automobile body in which a chipping-resistant coating film including a vinyl chloride-based resin is formed on the electrodeposition coating film.

[3] The method for forming a multilayer coating film according to [1] or [2], wherein the fatty acid diester compound is a compound prepared from a starting material containing an aliphatic dicarboxylic acid, and the aliphatic dicarboxylic acid is selected from the group consisting of butanedioic acid, pentanedioic acid, hexanedioic acid, heptanedioic acid, octanedioic acid, nonanedioic acid, decanedioic acid, undecanedioic acid and dodecanedioic acid.

In accordance with an embodiment of the present disclosure, the softness of a coating film can be maintained to obtain a smooth coating film even on a thermally expandable/shrinkable base in a process for forming a multilayer coating film, and thus a multilayer coating film having an excellent coating film appearance can be obtained. In addition, according to the present disclosure, sagging of an aqueous intermediate coating composition and an aqueous base coating composition can be effectively prevented.

DETAILED DESCRIPTION OF THE PREFERRED EMBODIMENTS

For example, in an aspect in which polymer resin particles dispersed in a solvent such as water are welded by volatilization of the solvent to form a coating film on a thermally expandable/shrinkable object to be coated, e.g. a coating film in the technical field of automobile bodies, etc., coating film defects such as creases and cracks may be generated in a heating process including a preheating step and a baking and curing step unless flexibility is high enough to follow thermal expansion/shrinkage of the object to be coated, e.g. a coating film.

For example, in the case of an automobile body or the like, an automobile body is used in which a chipping-resistant coating film is formed on an electrodeposition coating film for improving chipping resistance in a rocker portion or the like. The chipping-resistant coating film often contains a resin that may be thermally expanded/shrunk, and for example, a chipping-resistant coating film including a vinyl chloride-based resin is used.

There is the problem that when an intermediate coating composition is applied onto a chipping-resistant coating film including a thermally expandable resin such as a vinyl chloride-based resin, or a thermally shrinkable resin, and preheated, and in steps involving heating, such as a step of preheating an aqueous base coating composition and a step of baking and curing various kinds of coating compositions, the chipping-resistant coating film is thermally expanded/shrunk, so that a coating film formed from the intermediate coating composition cannot follow the behavior such as thermally expanded/shrunk of the chipping-resistant coating film, and thus the appearance of the intermediate coating film cannot be kept surface smoothness and flatness. In addition, not only the appearance of the intermediate coating film but also the coating film strength may be deteriorated, leading to generation of coating film defects such as creases and cracks.

Thus, it is required that the softness of a coating film be maintained during a film formation process to obtain a smooth coating film even on a thermally expandable/shrinkable base.

Hereinafter, an aqueous intermediate coating composition, an aqueous base coating composition and a clear coating composition which can be used in the present disclosure that achieves the above-described object will be each described, and thereafter a method for forming a multilayer coating film will be described in detail.

Aqueous Intermediate Coating Composition

The aqueous intermediate coating composition to be used in the method of the present disclosure contains a coating film forming resin, and the coating film forming resin comprises (a) an acrylic resin emulsion having a glass transition temperature of −50 to 20° C., an acid value of 2 to 60 mg KOH/g and a hydroxyl value of 10 to 120 mg KOH/g. In addition, the resin solid content of the (a) acrylic resin emulsion is 20 to 50 parts by mass based on 100 parts by mass of the total resin solid content of the coating film forming resin.

Further, the aqueous intermediate coating composition comprises (b) a film formation auxiliary agent which is a fatty acid diester compound having a boiling point of 280° C. or higher and 350° C. or lower. Also, the blending amount of the (b) film formation auxiliary agent is 2 to 30 parts by mass based on 100 parts by mass of the total resin solid content of the coating film forming resin.

Coating Film Forming Resin

The coating film forming resin comprises, for example, an acrylic resin emulsion with the resin dispersed or dissolved in an aqueous medium. The coating film forming resin further contains at least one resin selected from a polyester resin, a polyurethane resin and a polycarbonate resin, and may contain curing agents such as a melamine resin and a carbodiimide resin. In an aspect, the coating film forming resin comprises an acrylic resin emulsion, a hydroxyl group-containing polyester resin, a hydroxyl group-containing polyurethane resin, a polycarbonate resin, a melamine resin and a carbodiimide resin.

Here, the total resin solid content of the coating film forming resin in the aspect in which the coating film forming resin comprises a curing agent etc. means the total solid content of a main binder resin such as acrylic resin, and the curing agent.

Acrylic Resin Emulsion

The acrylic resin emulsion in the present disclosure is a hydroxyl group-containing acrylic resin emulsion.

The hydroxyl group-containing acrylic resin emulsion may contain a styrene-based monomer, and can be obtained by emulsion polymerization of a monomer mixture containing a (meth)acrylic acid alkyl ester (I), an acid group-containing ethylenically unsaturated monomer (II) and a hydroxyl group-containing ethylenically unsaturated monomer (III). One of the compounds shown below as examples of components of monomer mixture may be used, or two or more thereof may be appropriately combined, and used.

By blending a styrene-based monomer with the acrylic resin emulsion, sagging of the resulting aqueous intermediate coating composition during coating can be significantly prevented due to the hydrophobic effect of the styrene-based monomer.

Examples of the styrene-based monomer include such as styrene, α-methylstyrene, α-methylstyrene dimers, vinyltoluene and divinylbenzene. Among them, styrene is used in one embodiment from the viewpoints of hydrophobicity, cost, convenience of acquisition, and the like.

The content of the styrene-based monomer is for example 1 to 10% by mass, for example 2 to 8% by mass, for example 3 to 7% by mass based on the total amount of monomers used for synthesis of the acrylic resin emulsion. In the present disclosure, the content of the styrene-based monomer is within the above-mentioned range, a desirable hydrophobic effect can be obtained, so that occurrence of sagging of the resulting aqueous intermediate coating composition during coating can be suppressed. In addition, excellent physical properties can be imparted to an intermediate coating film formed from the aqueous intermediate coating composition of the present disclosure.

By blending the styrene-based monomer with the acrylic resin emulsion with the above-mentioned content, the water tolerance of the acrylic resin emulsion can be adjusted to 0.2 to 5 (ml), for example 0.3 to 4 (ml), and the hexane tolerance of the acrylic resin emulsion can be adjusted to 5 to 25 (ml), for example 6 to 23 (ml). In this specification, the water tolerance is an index for evaluating the degree of hydrophilicity, and the higher the value thereof, the higher the hydrophilicity. The hexane tolerance is an index for evaluating the degree of hydrophobicity, and the higher the value thereof, the higher the hydrophobicity.

When the water tolerance is less than 0.2 (ml), compatibility is reduced, so that turbidity may occur in the coating film, leading to deterioration of the coating film appearance. When the water tolerance is more than 5 (ml), water resistance may be reduced. Therefore, when the water tolerance is within the above-mentioned range, the storage stability of the aqueous intermediate coating composition is improved, so that coating workability is improved.

When the hexane tolerance is less than 5 (ml), compatibility is reduced, so that turbidity may occur in the coating film, leading to deterioration of the coating film appearance. In addition, when the hexane tolerance is more than 25 (ml), there is a problem, for example, that compatibility is reduced, leading to deterioration of the storage stability of the aqueous intermediate coating composition.

In this specification, the water tolerance is a value that can be measured in the following manner. The measurement temperature is set to 20° C., 0.5 g of a resin to be measured is weighed in a 100 ml beaker, 10 ml of acetone is added using a whole pipette, and the resin is dissolved in acetone with a magnetic stirrer. Next, using a 50 ml burette, deionized water is dropped to the acetone solution prepared as described above, and the addition amount of water (ml) at a point where turbidity occurs is defined as a water tolerance. The hexane tolerance is the addition amount (ml) of hexane which is measured in the same manner as in the case of the water tolerance except that water is replaced by n-hexane.

The hydroxyl group-containing acrylic resin emulsion to be used in the present disclosure is for example a hydroxyl group-containing acrylic resin emulsion having a water tolerance of 0.2 to 5 and a hexane tolerance of 5 to 25. By using such a hydroxyl group-containing acrylic resin, sagging of the aqueous intermediate coating composition of the present embodiment during coating can be significantly prevented, so that the coating film appearance is improved.

The (meth)acrylic acid alkyl ester (I) is used for forming the main skeleton of the acrylic resin emulsion. Specific examples of the (meth)acrylic acid alkyl ester (I) include methyl (meth)acrylate, ethyl (meth)acrylate, propyl (meth)acrylate, n-butyl (meth)acrylate, isobutyl (meth)acrylate, t-butyl (meth)acrylate, hexyl (meth)acrylate, 2-ethylhexyl (meth)acrylate, octyl (meth)acrylate, nonyl (meth)acrylate, decyl (meth)acrylate, dodecyl (meth)acrylate and stearyl (meth)acrylate.

The content of the (meth)acrylic acid alkyl ester (I) is for example 50 to 98% by mass, for example from 65 to 96% by mass, based on the total amount of monomers used for synthesis of the acrylic resin emulsion. The (meth)acrylic acid alkyl ester (I) may be used singly, or used in combination of two or more (meth)acrylic acid alkyl esters. However, in any of the aspects, the content is adjusted so that the glass transition temperature, acid value and hydroxyl value of the resulting acrylic resin each fall within a predetermined range according to the present disclosure.

The acid group-containing ethylenically unsaturated monomer (II) is used for improving various kinds of stability, such as storage stability, mechanical stability and stability against freezing, of the acrylic resin emulsion of the present disclosure, and accelerating reaction with a curing agent such as a melamine resin or the like during formation of the coating film. For example, the acid group is selected from a carboxyl group, a sulfonic acid group, a phosphoric acid group and the like. In one embodiment, the acid group is a carboxyl group from the viewpoint of the functions of improving various kinds of stability and accelerating curing reaction.

Examples of the carboxyl group-containing ethylenically unsaturated monomer include acrylic acid, methacrylic acid, crotonic acid, isocrotonic acid, ethacrylic acid, propylacrylic acid, isopropylacrylic acid, itaconic acid, maleic anhydride and fumaric acid. Examples of the sulfonic acid group-containing ethylenically unsaturated monomer include p-vinylbenzenesulfonic acid, p-acrylamidepropanesulfonic acid and t-butylacrylamidesulfonic acid. Examples of the phosphoric acid group-containing ethylenically unsaturated monomer include LIGHT ESTERS PM (manufactured by KYOEISHA CHEMICAL Co., LTD.) such as phosphoric acid monoesters of 2-hydroxyethyl acrylate and phosphoric acid monoesters of 2-hydroxypropyl methacrylate.

The content of the acid group-containing ethylenically unsaturated monomer (II) is for example 0.1 to 5% by mass, for example 0.1 to 3% by mass, based on the total amount of monomers used for synthesis of the acrylic resin emulsion. The acid group-containing ethylenically unsaturated monomer (II) may be used singly, or used in combination of two or more acid group-containing ethylenically unsaturated monomers. However, in any of the aspects, the content is adjusted so that the glass transition temperature, acid value and hydroxyl value of the acrylic resin each fall within a predetermined range according to the present disclosure.

The hydroxyl group-containing ethylenically unsaturated monomer (III) is used for imparting hydroxyl group-based hydrophilicity to the acrylic resin emulsion, enhancing workability and stability against freezing in use of the acrylic resin emulsion as a coating composition, and imparting curing reactivity with a melamine resin and an isocyanate curing agent.

The content of the hydroxyl group-containing ethylenically unsaturated monomer (III) is for example 1.0 to 32% by mass, for example 1.0 to 30% by mass, based on the total amount of monomers used for synthesis of the acrylic resin emulsion. The hydroxyl group-containing ethylenically unsaturated monomer (III) may be used singly, or used in combination of two or more hydroxyl group-containing ethylenically unsaturated monomers. However, in any of the aspects, the content is adjusted so that the glass transition temperature, acid value and hydroxyl value of the acrylic resin each fall within a predetermined range according to the present disclosure.

Examples of the hydroxyl group-containing ethylenically unsaturated monomer (III) include 2-hydroxyethyl (meth)acrylate, 2-hydroxypropyl (meth)acrylate, 4-hydroxybutyl (meth)acrylate and ε-caprolactone-modified acrylic monomers.

Specific examples of the ε-caprolactone-modified acrylic monomer include "PLACCEL FA-1", "PLACCEL FA-2", "PLACCEL FA-3", "PLAXEL FA-4", "PLACCEL FA-5", "PLACCEL FM-1", "PLACCEL FM-2", "PLACCEL FM-3", "PLACCEL FM-4" and "PLAXEL FM-5" manufactured by Daicel Chemical Industries Ltd.

The monomer mixture may contain at least one monomer selected from the group consisting of (meth)acrylonitrile and (meth)acrylamide as other components.

Further, the monomer mixture may contain a crosslinkable monomer such as a carbonyl group-containing ethylenically unsaturated monomer, a hydrolysis-polymerizable silyl group-containing monomer, and any of various polyfunctional vinyl monomers. Here, the resulting acrylic resin emulsion may be self-crosslinkable.

Emulsion polymerization can be performed by heating the monomer mixture under stirring in an aqueous liquid in the presence of a radical polymerization initiator and an emulsifier. For example, the reaction temperature is, for example, about 30 to 100° C., and the reaction time is, for example, about 1 to 10 hours. The reaction temperature may be adjusted by collectively adding or gradually dropping a monomer mixture or a monomer pre-emulsified liquid to a reaction vessel charged with water and an emulsifier.

As the radical polymerization initiator, a known initiator that is normally used for emulsion polymerization of an acrylic resin can be used. Specifically, as a water-soluble free radical polymerization initiator, for example, a persulfate such as potassium persulfate, sodium persulfate or ammonium persulfate may be used in the form of an aqueous solution. In addition, a so-called redox-based initiator obtained by combining an oxidizing agent such as potassium persulfate, sodium persulfate, ammonium persulfate or hydrogen peroxide with a reducing agent such as sodium hydrogen sulfite, sodium thiosulfate, rongalit or ascorbic acid may be used in the form of an aqueous solution.

As the emulsifier, an anionic or nonionic emulsifier selected from micelle compounds having a hydrocarbon group having 6 or more carbon atoms, and a hydrophilic moiety such as a carboxylic acid salt, a sulfonic acid salt or a sulfuric acid partial ester in the same molecule is used. Here, examples of the anionic emulsifier include alkali metal salts or ammonium salts of sulfuric acid half-esters of alkyl phenols or higher alcohols; alkali metal salts or ammonium salts of alkyls or allyl sulfonates; and alkali metal salts or ammonium salts of sulfuric acid half-esters of polyoxyethylene alkyl phenyl ethers, polyoxyethylene alkyl ethers or polyoxyethylene allyl ethers. Examples of the nonionic emulsifier include polyoxyethylene alkyl phenyl ethers, polyoxyethylene alkyl ethers and polyoxyethylene allyl ethers. In addition to these general-purpose anionic and nonionic emulsifiers, various kinds of anionic and nonionic reactive emulsifiers having a radical-polymerizable unsaturated double bond, i.e. a group such as an acryl-based, methacryl-based, propenyl-based, allyl-based, allyl ether-based or maleic acid-based group, in the molecule can be appropriately used singly or in combination of two or more thereof.

In addition, combined use of an auxiliary agent (chain transfer agent) for regulation of the molecular weight, such as a mercaptan-based compound or a lower alcohol is often used from the viewpoint of progressing emulsion polymerization, and promoting smooth and uniform formation of a coating film to improve adhesion to a base material, and such an auxiliary agent is appropriately used in combination according to a situation.

In addition, as emulsion polymerization, any polymerization method can be employed such as a normal single-stage continuous monomer uniform dropping method, a core/shell polymerization method which is a multi-stage monomer feed method, or a power feed polymerization method in which the composition of a monomer fed during polymerization is continuously changed.

In this way, the hydroxyl group-containing acrylic resin emulsion to be used in the present disclosure is prepared. The weight average molecular weight of the resulting acrylic resin is not particularly limited, and is generally about 50,000 to 1,000,000, for example about 100,000 to 800,000.

The glass transition temperature (Tg) of the acrylic resin is in a range of −50° C. to 20° C., for example −30° C. to 20° C., and in one embodiment a range of −25° C. to 20° C., for example −20° C. to 20° C. in a certain aspect. When the glass transition temperature (Tg) is in the above-mentioned range, an aqueous intermediate coating composition comprising an acrylic resin emulsion, when used in a wet-on-wet method, has improved affinity and/or adhesion with an undercoating film such as an electrodeposition coating film or a chipping-resistant coating film and a top coating film, and is well compatible with a wet state upper coating film at the interface, so that inversion does not occur. In addition, a coating film that is finally obtained is moderately flexible, leading to improvement of chipping resistance. Resultantly, a multilayer coating film having a quite excellent appearance can be formed.

In the present disclosure, when the glass transition temperature (Tg) of the acrylic resin is lower than −50° C., the mechanical strength of the coating film is insufficient, leading to a reduction in chipping resistance. On the other hand, when the glass transition temperature (Tg) of the resin is higher than 20° C., the coating film is hard and brittle, and therefore has poor impact resistance, and reduced chipping resistance. The type and the blending amount of each of the monomer components are selected so that the glass transition temperature (Tg) of the resin falls within the above-described range.

Here, in this specification, the glass transition temperature (Tg) of the acrylic resin can be calculated from the blending amounts of various kinds of monomers in the monomer mixture to be used for the synthesis of the acrylic resin emulsion.

The acid value of the acrylic resin is in a range of 2 to 60 mg KOH/g, for example 3 to 50 mg KOH/g, for example 5 to 30 mg KOH/g. When the acid value of the resin is in the above-mentioned range, various kinds of stability, such as storage stability, mechanical stability and stability against freezing, of the resin emulsion and the aqueous intermediate coating composition obtained using the resin emulsion are improved, and curing reaction with a curing agent such as a melamine resin sufficiently proceeds during formation of a coating film, so that various kinds of strength, chipping resistance and water resistance of the coating film are improved.

When the acid value of the resin is less than 2 mg KOH/g, various kinds of stability as described above may be deteriorated, curing reaction with a curing agent such as a melamine resin does not sufficiently proceed, and thus the coating film are poor in various kinds of strength, chipping resistance and water resistance. On the other hand, when the acid value of the resin is more than 60 mg KOH/g, the polymerization stability of the resin may be deteriorated, various kinds of stability as described above may be deteriorated contrarily, and/or the resulting coating film may be poor in water resistance. The type and the blending amount of each of the monomer components can be selected so that the acid value of the resin falls within the above-described range. As described above, it is important to use a carboxyl group-containing monomer in the acid group-containing ethylenically unsaturated monomer (II), and the monomer (II) contains a carboxyl group-containing monomer in an amount of for example 50% by mass or more, for example 80 mass % or more.

The hydroxyl value of the acrylic resin is in a range of 10 to 120 mg KOH/g, for example 10 to 70 mg KOH/g. When the hydroxyl value is in the above-mentioned range, the resin has moderate hydrophilicity, workability in use as a coating composition comprising a resin emulsion, and stability against freezing are enhanced, and curing reactivity with a melamine resin, an isocyanate-based curing agent or the like is sufficient. In the present disclosure, when the hydroxyl value is less than 10 mg KOH/g, curing reaction with the curing agent may be insufficient, the coating film may have poor mechanical properties, lack chipping resistance, and be poor in water resistance and solvent resistance. On the other hand, when the hydroxyl value is more than 120 mg KOH/g, the water resistance of the resulting coating film may be reduced, the resin may have poor compatibility with the curing agent, the coating film may be strained, so that curing reaction unevenly proceeds, and as a result, the coating film may be poor in various properties, particularly chipping resistance, solvent resistance and water resistance. The type and the blending amount of each of the monomer components can be selected so that the hydroxyl value of the resin falls within the above-described range.

A basic compound can be added to the acrylic resin emulsion that is obtained from the present disclosure, for partially or totally neutralizing the carboxylic acid to maintain the stability of the acrylic resin emulsion. Ammonia, various kinds of amines, alkali metals and the like are normally used as these basic compounds, and these compounds are appropriately used in the present disclosure.

The resin solid content of the (a) acrylic resin emulsion is 20 to 50 parts by mass, for example 20 to 40 parts by mass, for example 25 to 35 parts by mass based on 100 parts by mass of the total resin solid content of the coating film forming resin.

When the coating film forming resin comprises the (a) acrylic resin emulsion according to the present disclosure in an amount in the above-mentioned range, various kinds of stability, such as storage stability, mechanical stability and stability against freezing, of the coating film formed from the aqueous intermediate coating composition is improved, and curing reaction with a curing agent such as a melamine resin sufficiently proceeds during formation of a coating film, so that various kinds of strength, chipping resistance and water resistance of the coating film are improved.

Polyester Resin

In the present disclosure, the coating film forming resin in the aqueous intermediate coating composition may contain a polyester resin, and as the polyester resin, a resin that is commonly used in the art can be used. For example, the coating film forming resin may contain a hydroxyl group-containing polyester resin.

When the coating film forming resin comprises a polyester resin, the viscosity of the coating film after coating can be properly maintained to obtain a favorable appearance.

The solid content of the polyester resin based on 100 parts by mass of the total resin solid content of the coating film forming resin is 0 to 55 parts by mass, for example 5 to 30 parts by mass, for example 5 to 20 parts by mass, and 5 to 15 parts by mass in a certain aspect.

Examples of the hydroxyl group-containing polyester resin may include oil-free polyester resins obtained by condensation of a polyhydric alcohol component and a polybasic acid component, and oil-modified polyester resins obtained by adding an oil component such as castor oil, dehydrated castor oil, tung oil, safflower oil, soybean oil, linseed oil, tall oil and coconut oil or the like, one of fatty acids thereof or a mixture of two or more of the fatty acids to the polyhydric alcohol component and the polybasic acid component, and reacting these three components. In addition, a polyester resin grafted with an acrylic resin or a vinyl resin can also be used. Further, a urethane-modified polyester resin obtained by reacting a polyisocyanate compound with a polyester resin obtained by reacting a polyhydric alcohol component with a polybasic acid component can also be used.

The number average molecular weight (Mn) of the hydroxyl group-containing polyester resin is 800 to 10000, for example 1000 to 8000. When the number average molecular weight (Mn) is less than 800, stability in dispersion of the polyester resin in water may be deteriorated, and when the number average molecular weight (Mn) is more than 10000, the viscosity of the resin may increase, so that the solid content concentration of a coating composition formed from the polyester resin decreases, leading to deterioration of coating workability.

The hydroxyl value of the hydroxyl group-containing polyester resin is 35 to 170 mg KOH/g, for example 50 to 150 mg KOH/g. When the hydroxyl value is less than 35 mg KOH/g, the curability of the resulting coating film may be reduced, and when the hydroxyl value is more than 170 mg KOH/g, the chipping resistance of the coating film may be reduced.

For example, the hydroxyl group-containing polyester resin has an acid value of 15 to 100 mg KOH/g. The acid value of the hydroxyl group-containing polyester resin is for example 20 to 80 mg KOH/g. When the acid value is less than 15 mg KOH/g, the water dispersion stability of the polyester resin may be deteriorated, and when the acid value is more than 100 mg KOH/g, the water resistance of a coating film formed from the polyester resin may be reduced.

The glass transition temperature of the hydroxyl group-containing polyester resin is for example −40 to 50° C. When the glass transition temperature is lower than −40° C., the hardness of the obtained coating film may be reduced, and when the glass transition temperature is higher than 50° C., base concealing performance may be deteriorated. The glass transition temperature is for example −40 to 10° C. The glass transition temperature can be determined by calculation from the blending amounts of various kinds of monomers in a monomer mixture that is used for synthesis.

Examples of the polyhydric alcohol component include diols such as ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol esters, 2-butyl-2-ethyl-1,3-propanediol, 3-methyl-1,5-pentanediol, 2,2,4-trimethylpentanediol and hydrogenated bisphenol A; polyol components with a valence of 3 or more, such as trimethylolpropane, trimethylolethane, glycerin and pentaerythritol; and hydroxycarboxylic acid components such as 2,2-dimethylolpropionic acid, 2,2-dimethylolbutanoic acid, 2,2-dimethylolpentanoic acid, 2,2-dimethylolhexanoic acid and 2,2-dimethyloloctanoic acid.

Examples of the polybasic acid component include polybasic acid components and anhydrides thereof such as aromatic polyvalent carboxylic acids and acid anhydrides such as phthalic anhydride, isophthalic acid, terephthalic acid, trimellitic anhydride, tetrabromophthalic anhydride, tetrachlorophthalic anhydride and pyromellitic anhydride; cycloaliphatic polyvalent carboxylic acids and anhydrides such as hexahydrophthalic anhydride, tetrahydrophthalic anhydride and 1,4-cyclohexanedicarboxylic acid and 1,3-cyclohexanedicarboxylic acid; aliphatic polyvalent carboxylic acids and anhydrides such as maleic anhydride, fumaric acid, succinic anhydride, adipic acid, sebacic acid and azelaic acid. Monobasic acids such as benzoic acid and t-butylbenzoic acid may be used in combination as necessary.

In preparation of the polyester resin, a monohydric alcohol, a monoepoxide compound such as CARDURA E (trade name: manufactured by Shell Chemical Co.), and a lactone (β-propiolactone, dimethylpropiolactone, butyrolactone, γ-valerolactone, ε-caprolactone, γ-caprolactone, γ-caprylolactone, crotolactone, δ-valerolactone, δ-caprolactone or the like) may be used in combination as reaction components. In particular, the lactone itself forms a polyester chain by undergoing ring-opening addition to the polyester chain of a polyvalent carboxylic acid and a polyhydric alcohol, and helps to improve the chipping resistance of the aqueous intermediate coating composition. The above-mentioned components may be contained in an amount of 3 to 30%, for example 5 to 20%, particularly for example 7 to 15% based on the total mass of all reaction components.

The hydroxyl group-containing polyester resin can be easily made aqueous by adjusting the acid value thereof and neutralizing (e.g., 50% or more of) carboxyl groups with a basic substance. Examples of the basic substance to be used here include ammonia, methylamine, ethylamine, dimethylamine, diethylamine, trimethylamine, triethylamine, dimethylethanolamine, diethanolamine and triethanolamine, among which diethanolamine, dimethylethanolamine, triethanolamine and the like are selected in the one embodiment. The neutralization ratio in the neutralization is not particularly limited, and is, for example, 80 to 120%.

Polyurethane Resin

In the present disclosure, the coating film forming resin in the aqueous intermediate coating composition may contain a polyurethane resin, and as the polyurethane resin, a resin that is commonly used in the art can be used. For example, the coating film forming resin may contain an aqueous polyurethane resin.

When the coating film forming resin comprises a polyurethane resin, the flexibility of the coating film is improved, so that crosslinking can be made uniform. Thus, the chipping resistance of the coating film is more improved.

The solid content of the polyurethane resin is 20 to 50 parts by mass, for example 20 to 40 parts by mass, in one embodiment 20 to 35 parts by mass, for example 20 to 30 parts by mass based on 100 parts by mass of the total resin solid content of the coating film forming resin.

The aqueous polyurethane resin is a resin obtained by reaction of a diisocyanate compound with a diol containing any of various kinds of polyol components such as, for example, acrylic, polyester, polyether and polycarbonate, and examples thereof may include resins having a urethane bond. For the urethane resin, for example, a resin containing a carboxyl group may be used, and the carboxyl group is introduced such that some or all of hydroxyl groups derived from a starting material are modified into carboxyl groups with an acid anhydride or the like, or a compound having a hydroxyl group and a carboxyl group per molecule is used as a diol component. The diol having a carboxyl group is not particularly limited, and preferred examples thereof may include dimethylolpropionic acid.

In one aspect, the aqueous polyurethane resin is a polyether-based polyurethane resin. When the coating film forming resin comprises a polyether-based polyurethane resin, for example, the flexibility of the coating film can be further improved, so that crosslinking can be made uniform. Thus, the chipping resistance of the coating film can be further improved.

Examples of the diisocyanate compound may include 2,4-tolylene diisocyanate (2,4-TDI), 2,6-tolylene diisocyanate (2,6-TDI), mixtures thereof (TDI), diphenylmethane-4,4'-diisocyanate (4,4'-MDI), diphenylmethane-2,4'-diisocyanate (2,4'-MDI) and mixtures thereof (MDI), naphthalene-1,5-diisocyanate (NDI), 3,3'-dimethyl-4,4'-biphenylene diisocyanate (TODI), xylylene diisocyanate (XDI), dicyclohexylmethane diisocyanate (hydrogenated HDI), isophorone diisocyanate (IPDI), hexamethylene diisocyanate (HDI) and hydrogenated xylylene diisocyanate (HXDI).

Polycarbonate Resin

In the present disclosure, the coating film forming resin in the aqueous intermediate coating composition may contain a polycarbonate resin, and as the polycarbonate resin, a resin that is commonly used in the art can be used. For example, the coating film forming resin comprises a polycarbonate resin having a hydroxyl group at a terminal. When the coating film forming resin comprises a polycarbonate resin, the coating workability and popping resistance of the coating film are further improved, and the smoothness of the resulting coating film is further improved.

The solid content of the polycarbonate resin based on 100 parts by mass of the total resin solid content of the coating film forming resin is, for example, 0 to 30 parts by mass, for example 1 to 30 parts by mass, and 1 to 20 parts by mass, for example 1 to 15 parts by mass in a certain aspect.

Examples of the polycarbonate resin, include polycarbonate resins having a hydroxyl group at a terminal and having a number average molecular weight of 1,000 to 10,000, for example 2,000 to 6,000.

When the number average molecular weight of the polycarbonate resin to be used in the present disclosure is less than 1,000, the foaming resistance of the coating film and the water resistance of the coating film may be reduced, and when the number average molecular weight is more than 10,000, the foaming resistance of the coating film may be reduced, and in particular, the smoothness of the coating film may be deteriorated.

A preferred composition of the polycarbonate resin is that of a polycarbonate resin obtained by reaction of a carbonate monomer, which is selected from a dialkyl carbonate and ethylene carbonate, with a linear dihydric alcohol, a branched dihydric alcohol and a polyhydric alcohol with a valence of 3 or more, the polycarbonate resin including at least 10 mol % of the branched dihydric alcohol based on the amount of all the alcohols, and 10 mol % or more of the polyhydric alcohol with a valence of 3 or more. Here, when the amount of the branched dihydric alcohol is less than 10 mol % based on the amount of all the alcohols, there is a disadvantage that the polycarbonate resin may be crystallized, and the coating film may have somewhat poor foaming resistance. In addition, when the amount of the polyhydric alcohol with a valence of 3 or more is less than 10 mol %, curability and the water resistance of the coating film may be deteriorated.

Specific examples of the branched chain dihydric alcohol include 2-methyl-1,3-propanediol, 3-methyl-1,5-pentanediol, neopentyl glycol, 2,2-diethyl-1,3-propanediol, 2-butyl-2-ethyl-1,3-propanediol, 2-methyl-1,8-octanediol, 2,2,4-trimethyl-1,3-pentanediol, 2-ethyl-1,3-hexanediol, 1,4-cyclohexanedimethanol and tricyclodecanedimethanol as typical examples.

Typical examples of the polyhydric alcohol with a valence of 3 or more, which is used for the coating composition according to the present disclosure, include glycerin, trimethylolethane, trimethylolpropane, dimers of trimethylolpropane and pentaerythritol. Specific examples of the linear dihydric alcohol include 1,3-propylene glycol, 1,4-butanediol, 1,5-pentanediol, 1,6-hexanediol, 1,8-octanediol, 1,9-nonanediol and 1,10-decanediol as typical examples.

Melamine Resin

The melamine resin is not particularly limited as long as it undergoes a curing reaction with an acrylic resin contained as an emulsion and a hydroxyl group-containing polyester resin, and can be blended in the aqueous intermediate coating composition. For example, an imino-type melamine resin is selected, and examples thereof include CYMEL 211 (trade name) (imino-type melamine resin manufactured by Mitsui Cytec Co., Ltd.) and CYMEL 327 (trade name) (imino-type melamine resin manufactured by Mitsui Cytec Co., Ltd.).

The melamine resin can be used as a curing agent. In a certain aspect, the solid content of the melamine resin based on 100 parts by mass of the total resin solid content of the coating film forming resin is 10 to 50 parts by mass, for example 10 to 40 parts by mass, for example 15 to 35 parts by mass.

When the solid content of the melamine resin is in the above-mentioned range, curing reaction sufficiently proceeds, so that various kinds of strength of the coating film, chipping resistance and water resistance are further improved.

In addition, the melamine resin is for example an alkyl-etherified melamine resin that is alkyl-etherified, for example a melamine resin substituted with a methoxy group and/or a butoxy group. Examples of the melamine resin include CYMEL 325, CYMEL 327, CYMEL 370 and MYCOAT 723 as those having a methoxy group alone; CYMEL 202, CYMEL 204, CYMEL 232, CYMEL 235, CYMEL 236, CYMEL 238, CYMEL 254, CYMEL 266 and CYMEL 267 (each of which is a trade name) (manufactured by Mitsui Cytec Co., Ltd.) as those having both a methoxy group and a butoxy group); and MYCOAT 506 (trade name) (manufactured by Mitsui Cytec Co., Ltd.), U-VAN 20N60 and U-VAN 20SE (each of which is a trade name) (manufactured by Mitsui Chemicals, Inc.) as those having a butoxy group alone. These resins may be used singly, or used in combination of two or more thereof.

Carbodiimide

As a carbodiimide compound, one prepared by any of various methods can be used. Examples of the carbodiimide compound may include those obtained by synthesizing an isocyanate-terminated polycarbodiimide by a condensation reaction involving decarbonation of an organic diisocyanate.

The solid content of the carbodiimide compound is 0 to 30 parts by mass, for example 1 to 20 parts by mass, for example 1 to 10 parts by mass based on 100 parts by mass of the total resin solid content of the coating film forming resin.

When the solid content of the carbodiimide resin is in the above-mentioned range, curing reaction sufficiently proceeds, so that various kinds of strength of the coating film, chipping resistance and water resistance are further improved.

More specifically, the carbodiimide compound may be for example a hydrophilization-modified carbodiimide compound obtained by the steps of:
reacting a polycarbodiimide compound containing at least two isocyanate groups per molecule with a polyol having a hydroxyl group at a molecular terminal at such a ratio that the molar amount of isocyanate groups of the polycarbodiimide compound is larger than the molar amount of hydroxyl groups of the polyol in production of the polycarbodiimide compound;
and reacting a hydrophilizing agent having active hydrogen and a hydrophilic moiety with the reaction product obtained in the above step.

The carbodiimide compound containing at least two isocyanate groups per molecule is not particularly limited, but is for example a carbodiimide compound having isocyanate groups at both terminals from the viewpoint of reactivity. A method for producing a carbodiimide compound having isocyanate groups at both terminals is well known by those skilled in the art, and for example, a condensation reaction involving decarbonation of an organic diisocyanate can be used.

Film Formation Auxiliary Agent

The aqueous intermediate coating composition to be used in the method of the present disclosure includes (b) a film formation auxiliary agent which is a fatty acid diester compound having a boiling point of 280° C. or higher and 350° C. or lower.

When the aqueous intermediate coating composition comprises the film formation auxiliary agent, for example a predetermined fatty acid diester compound, a multilayer coating film having a favorable coating film appearance can be formed without causing defects such as a poor coating film appearance even when an aqueous intermediate coating composition comprising the (a) acrylic resin emulsion is applied to form an uncured intermediate coating film on, for example, a chipping-resistant coating film provided on a rocker portion in an automobile body, for example a chipping-resistant coating film including a vinyl chloride resin, and the intermediate coating film is then preheated. Further, the coating film may have excellent coating film physical properties such as excellent chipping resistance.

By using the film formation auxiliary agent according to the present disclosure, the softness of a coating film can be maintained during a film formation process to obtain a smooth coating film even on a thermally expandable/shrinkable base. In addition, when polymer resin particles dispersed in a solvent such as water are welded by volatilization of the solvent to form a coating film, generation of coating film defects such as creases and cracks can be suppressed even when the base is thermally expandable/shrinkable because the coating film has such flexibility that the coating film can follow thermal expansion/shrinkage of the base.

The boiling point is 280 to 350° C., for example 280 to 320° C., and 280 to 300° C. in a certain aspect.

When the boiling point is in the above-mentioned range, the softness of a coating film can be maintained to obtain a smooth coating film even on a thermally expandable/shrinkable base in a process for forming a multilayer coating film, and thus a multilayer coating film having an excellent coating film appearance can be obtained. In addition, sagging of the aqueous intermediate coating composition can be effectively prevented by preheating the intermediate coating composition.

In the present disclosure, the aqueous intermediate coating composition comprising a predetermined film formation auxiliary agent is preheated under conditions in the present disclosure, and thus sagging of the aqueous coating composition can be suppressed, so that layer mixing between the intermediate coating film and the base coating film can be further suppressed.

The boiling point of the fatty acid diester compound in this specification is measured in accordance with an equilibrium reflux boiling point test method as specified in JIS K 2233 (2006).

The fatty acid diester compound is a compound prepared from a starting material containing an aliphatic dicarboxylic acid, and can be prepared by, for example, subjecting an aliphatic dicarboxylic acid and an alcohol to an esterification reaction. Examples of the aliphatic dicarboxylic acid that forms the fatty acid diester compound include aliphatic dicarboxylic acids having 4 to 12 carbon atoms. Specific examples of the aliphatic dicarboxylic acid include butanedioic acid, pentanedioic acid, hexanedioic acid, heptanedioic acid, octanedioic acid, nonanedioic acid, decanedioic acid, undecanedioic acid and dodecanedioic acid. Among them, butanedioic acid, hexanedioic acid, nonanedioic acid, decanedioic acid and the like are for example used.

Examples of the alcohol to be used for the esterification reaction include linear aliphatic saturated alcohols having 1 to 10 carbon atoms, and branched aliphatic saturated alcohols having 3 to 10 carbon atoms.

Specific examples of the linear aliphatic saturated alcohol having 1 to 10 carbon atoms include methanol, ethanol, n-propanol, n-butanol, n-pentanol, n-hexanol, n-heptanol, n-octanol, n-decanol, n-undecanol and n-dodecanol.

Specific examples of the branched aliphatic saturated alcohol having 3 to 10 carbon atoms include branched aliphatic saturated alcohols having 3 carbon atoms, such as 2-propanol;
branched aliphatic saturated alcohols having 4 carbon atoms, such as 2-methyl-1-propanol, 2-butanol and 2-methyl-2-propanol;
branched aliphatic saturated alcohols having 5 carbon atoms, such as 3-methyl-1-butanol, 2-pentanol, 3-pentanol, 2-methyl-1-butanol, 2-methyl-2-butanol, 3-methyl-2-butanol and 2,2-dimethyl-1-propanol;
branched aliphatic saturated alcohols having 6 carbon atoms, such as 4-methyl-1-pentanol, 2-hexanol, 3-hexanol, 2-methyl-1-pentanol and 2-ethyl-1-butanol;
branched aliphatic saturated alcohols having 7 carbon atoms, such as 5-methyl-1-hexanol, 2-heptanol, 3-heptanol, 4-heptanol, 2-methyl-1-hexanol, 2-methyl-3-hexanol and 2-ethyl-1-pentanol;
branched aliphatic saturated alcohols having 8 carbon atoms, such as 6-methyl-1-heptanol, 2-octanol, 3-octanol, 2-methyl-1-heptanol and 2-ethyl-1-hexanol;
branched aliphatic saturated alcohols having 9 carbon atoms, such as 7-methyl-1-octanol, 2-nonanol, 3-nonanol, 2-methyl-1-octanol, 3-methyl-1-octanol, 4-methyl-1-octanol, 5-methyl-1-octanol, 6-methyl-1-octanol, 2-ethyl-1-heptanol, 2,4-dimethyl-1-heptanol, 2,5-dimethyl-1-heptanol, 4,6-dimethyl-1-heptanol, 2,6-dimethyl-4-heptanol, 3,5,5-trimethyl-1-hexanol and 2,5,5-trimethyl-1-hexanol; and
branched aliphatic saturated alcohols having 10 carbon atoms, such as 8-methyl-1-nonanol, 2-decanol, 3-decanol, 2-methyl-1-nonanol, 2-ethyl-1-octanol, 2-propyl-1-heptanol, 2,7-dimethyl-1-octanol, 2,6-dimethyl-2-octanol, 2,4-dimethyl-1-octanol, 3,7-dimethyl-1-octanol, 3,6-dimethyl-3-octanol, 4-methyl-2-propyl-1-hexanol, 5-methyl-2-propyl-1-hexanol, 2-(1-methylethyl)-4-methyl-1-hexanol and 2-(1-methylethyl)-5-methyl-1-hexanol.

The esterification reaction of an aliphatic dicarboxylic acid and an alcohol can be carried out in accordance with a procedure that is normally used. For example, the esterification reaction can be carried out by heating and stirring the reactants under an inert gas atmosphere of nitrogen, argon or the like. In the esterification reaction, an esterification catalyst may be used as necessary.

In the esterification reaction, the amount of the alcohol based on 1 mole of the aliphatic dicarboxylic acid is, for example, 2 to 5 moles (1 to 2.5 equivalents of the alcohol based on 1 equivalent of the carboxylic acid group), for example 2.01 to 3 moles (1.005 to 1.5 equivalents of the alcohol based on 1 equivalent of the carboxylic acid group), and for example 2.02 to 2.5 moles (1.01 to 1.25 equivalents of the alcohol based on 1 equivalent of the carboxylic acid group) in a certain aspect.

Examples of the catalyst that can be used as necessary in the esterification reaction include mineral acids, organic acids, Lewis acids and alkali metals. Examples of the mineral acid include sulfuric acid, hydrochloric acid and phosphoric acid. Examples of the organic acid include p-toluenesulfonic acid and methanesulfonic acid. Examples of the Lewis acid include aluminum derivatives, tin derivatives, titanium derivatives, lead derivatives and zinc derivatives. Examples of the alkali metal include sodium alkoxides, potassium alkoxides, sodium hydroxide and potassium hydroxide. Specific examples of the some embodiment, esterification catalyst include p-toluenesulfonic acid, tetraalkyl titanates having 3 to 8 carbon atoms, titanium oxide, titanium hydroxide, sodium alkoxides having 1 to 4 carbon atoms, sodium hydroxide, fatty acid tins having 3 to 12 carbon atoms, tin oxide, tin hydroxide, zinc oxide, zinc hydroxide, lead oxide, lead hydroxide, aluminum oxide and aluminum hydroxide. These esterification catalysts may be used singly, or used in combination of two or more thereof.

When a catalyst is used in the esterification reaction, for example, the use amount of the catalyst is for example 0.01 to 5.0% by mass, for example 0.02 to 4.0% by mass, still for example 0.03 to 3.0% by mass based on the total amount of the aliphatic dicarboxylic acid and the alcohol.

Reaction conditions in the esterification reaction of the aliphatic dicarboxylic acid and the alcohol can be appropriately selected according to starting materials to be used and a reaction scale. The reaction temperature may be, for example, 100 to 230° C. The reaction time may be, for example, 2 to 30 hours.

In the esterification reaction, water generated by the esterification reaction may be distilled off using an azeotropic solvent such as benzene, toluene, xylene or cyclohexane.

The blending amount of the (b) film formation auxiliary agent is 2 to 30 parts by mass, for example 2 to 20 parts by mass, for example 2 to 15 parts by mass based on 100 parts by mass of the total resin solid content of the coating film forming resin.

When the aqueous intermediate coating composition comprises the film formation auxiliary agent according to the present disclosure in an amount in the above-mentioned range, a multilayer coating film can be formed without causing defects such as a poor coating film appearance when the aqueous intermediate coating composition according to the present disclosure is applied, and preheated to form an uncured intermediate coating film on, for example, a chipping-resistant coating film provided on a rocker portion in an automobile body, for example a chipping-resistant coating film including a vinyl chloride resin.

Further, by blending the film formation auxiliary agent in an amount in the above-mentioned range, excessive film formability can be suppressed.

In the present disclosure, the rupture elongation of a cured film obtained by mixing the (a) acrylic resin emulsion and the (b) film formation auxiliary agent at a ratio of 3:1 in terms of a mass ratio of the solid content of the (a) acrylic resin emulsion and the (b) film formation auxiliary agent, and curing the mixture is 1% or more, for example 1.5% or more, for example 2% or more. When the cured film has a rupture elongation in the above-mentioned range, the coating film formed according to the present disclosure has such flexibility that the coating film can follow expansion/shrinkage of a coating film formed on an object to be coated, e.g. an automobile body, and thus coating film defects such as creases and cracks are not generated in a heating process including a preheating step, a baking and curing step and the like. In addition, a smooth coated film can be obtained.

The rupture elongation is 2% or more and 5% or less, for example 2% or more and 4.5% or less in a certain aspect, and 2% or more and 4% or less in another aspect.

For adjusting the viscosity of the aqueous intermediate coating composition, the aqueous intermediate coating composition in the present disclosure may contain a viscosity imparting agent. The blending amount of the viscosity imparting agent is 0 to 10 parts by mass, for example 0.01 to 5 parts by mass, for example 0.03 to 5 parts by mass based on 100 parts by mass of the total resin solid content of the coating film forming resin contained in the aqueous intermediate coating composition.

When aqueous intermediate coating composition comprises a viscosity imparting agent in an amount in the above-mentioned range, a favorable thickening effect can be obtained, so that sagging during coating can be suppressed. Further, an excellent appearance is obtained, and the obtained coating film has excellent physical properties.

The viscosity imparting agent may be, for example, an association-type viscosity imparting agent as described later.

Association-Type Viscosity Imparting Agent

The aqueous intermediate coating composition to be used in the method of the present disclosure may comprise an association-type viscosity imparting agent. One association-type viscosity imparting agent may be used, or a combination of association-type viscosity imparting agents may be used.

The association-type viscosity imparting agent to be used for the aqueous intermediate coating composition according to the present disclosure contains a urethane compound (A) represented by the following formula (1), and a urethane compound (B) represented by the following formula (2).

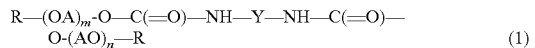

$$R{-}(OA)_m{-}O{-}C({=}O){-}NH{-}Y{-}NH{-}C({=}O){-}O{-}(AO)_n{-}R \quad (1)$$

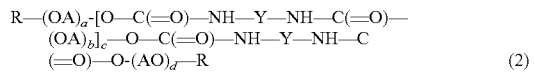

$$R{-}(OA)_a{-}[O{-}C({=}O){-}NH{-}Y{-}NH{-}C({=}O){-}(OA)_b]_c{-}O{-}C({=}O){-}NH{-}Y{-}NH{-}C({=}O){-}O{-}(AO)_d{-}R \quad (2)$$

[In the formula,
R(s) each independently represent a hydrocarbon group having 8 to 24 carbon atoms,
Y(s) each independently represent a reaction residue obtained by removing an isocyanato group from a diisocyanate,
OA(s) each independently represent an oxyalkylene group having 2 to 4 carbon atoms,
AO(s) each independently represent an alkyleneoxy group having 2 to 4 carbon atoms,
O represents an oxygen atom,
C represents a carbon atom,
N represents a nitrogen atom,
m and n each independently represent an integer of 20 to 500,
a and d each independently represent an integer of 1 to 100,
b represents an integer of 40 to 500,
c represents an integer of 1 to 5,
(b×c) is 150 to 2500,
a plurality of R(s) and Y(s) may be the same or different, respectively, and
each of the urethane compound (A) and the urethane compound (B) has at least 80% by mass of oxyethylene groups and ethyleneoxy groups based on the total mass of oxyalkylene groups and alkyleneoxy groups.]

Examples of the hydrocarbon group (R) having 8 to 24 carbon atoms include linear alkyls such as n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl and n-docosyl; branched alkyls such as 2-ethylhexyl, isodecyl, isotridecyl and isostearyl;

linear alkenyls such as n-octenyl, n-decenyl, n-undecenyl, n-dodecenyl, n-tridecenyl, n-tetradecenyl, n-pentadecenyl, n-hexadecenyl, n-heptadecenyl and n-octadecenyl; and branched alkenyls, isooctenyl, isodecenyl, isoundecenyl, isododecenyl, isotridecenyl, isotetradecenyl, isopentadecenyl, isohexadecenyl, isoheptadecenyl and isooctadecenyl. Among them, linear alkyls and linear alkenyls may be selected, linear alkyls are selected in one embodiment, and n-hexadecyl, n-heptadecyl, n-octadecyl, n-nonadecyl, n-eicosyl, n-heneicosyl and n-docosyl are described, from the viewpoint of obtained film property and so on. R(s) in the above formula may be the same or different.

Examples of the diisocyanate that forms the reaction residue (Y) obtained by removing an isocyanate group from a diisocyanate include aliphatic diisocyanates, aromatic diisocyanates and cycloaliphatic diisocyanates. Y(s) in the above formula may be the same or different.

As the aliphatic diisocyanate, an aliphatic diisocyanate having 3 to 15 carbon atoms, etc. can be used, and examples thereof include methylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, bis(isocyanatopropyl)ether, 1,1-dimethylbutane-1,4-diisocyanate, 3-methoxyhexane-1,6-diisocyanate, 2,2,4-trimethylpentane-1,5-diisocyanate, 3-butoxy-1,6-hexanediisocyanate and 1,4-butyleneglycol-bis(isocyanatopropyl)ether.

As the aromatic diisocyanate, an aromatic diisocyanate having 8 to 20 carbon atoms, etc. can be used, and examples thereof include metaphenylene diisocyanate, paraphenylene diisocyanate, 2,4-tolylene diisocyanate, 2,6-tolylene diisocyanate, dimethylbenzene diisocyanate, ethylbenzene diisocyanate, isopropylbenzene diisocyanate, biphenyl diisocyanate, 4,4'-diisocyanato-2,2'-dimethylbiphenyl, 4,4'-diisocyanato-3,3'-dimethoxybiphenyl, 1,5-diisocyanatonaphthalene, 4,4'-diisocyanatodiphenylmethane-4,4'-diisocyanato-2,2'-dimethyldiphenylmethane, 4,4'-diisocyanato-3,3'-dimethoxydiphenylmethane, 3,3'-diisocyanato-4,4'-dimethoxydiphenylmethane, 3,3'-diisocyanato-4,4'-diethoxydiphenylmethane, 4,4'-diisocyanato-2,2'-dimethyl-5,5'-dimethoxydiphenylmethane, metaxylylene diisocyanate, paraxylylene diisocyanate and tetramethylxylylene diisocyanate.

As the cycloaliphatic diisocyanate, cycloaliphatic diisocyanate having 8 to 20 carbon atoms, etc. can be used, and examples thereof include 1,3-diisocyanatocyclohexane, 1,3-bis(isocyanatomethyl)cyclohexane, 1-isocyanato-3-isocyanatomethyl-3,5,5-trimethylcyclohexane and 4,4'-diisocyanatodicyclohexylmethane.

Among these diisocyanates, at least one of aliphatic diisocyanates and cycloaliphatic diisocyanates are selected, aliphatic diisocyanates are selected in some embodiment, and at least one of hexamethylene diisocyanate and octamethylene diisocyanate are selected in some embodiment.

Examples of the oxyalkylene group (OA) having 2 to 4 carbon atoms include oxyethylene, oxypropylene and oxybutylene. The oxyalkylene group may be a mixture of a plurality of oxyalkylene groups as described above. In the case of a mixture of a plurality of oxyalkylene groups, the bonding mode may be any of a block bonding mode, a random bonding mode and a combination thereof, but a block bonding mode and a combination of a block bonding mode and a random bonding mode may be selected, and in one embodiment, a block bonding mode may be selected.

Examples of the alkyleneoxy group (AO) having 2 to 4 carbon atoms include ethyleneoxy, propyleneoxy and butyleneoxy. The alkyleneoxy group may be a mixture of a plurality of alkyleneoxy groups as described above. In the case of a mixture of a plurality of oxyalkylene groups, the bonding mode may be any of a block bonding mode, a random bonding mode and a combination thereof, but a block bonding mode and a combination of a block bonding mode and a random bonding mode is selected in one embodiment, and a block bonding mode is selected in one embodiment.

Each of the urethane compound (A) represented by the general formula (1) and the urethane compound (B) represented by the general formula (2) necessarily contains an oxyethylene group and an ethyleneoxy group, and the content (% by mass) thereof is for example at least 80% by mass, for example 85% by mass or more, for example 90% by mass or more based on the total mass of oxyalkylene groups and alkyleneoxy groups of each of the compounds. When the content of the oxyethylene group and the ethyleneoxy group is in the above-mentioned range, finishing property is further improved.

m and n each independently represent an integer of 20 to 500, for example 30 to 300, for example 40 to 200. When m and n are in the above-mentioned range, finishing property is further improved.

a and d each independently represent an integer of 1 to 100, for example 2 to 70, for example 3 to 40. When a and d are in the above-mentioned range, finishing property is further improved.

b represents an integer of 40 to 500, for example 55 to 400, for example 70 to 300. When b is in the above-mentioned range, finishing property is further improved.

c represents an integer of 1 to 5, for example 1 to 4, for example 1 to 3. When c is in the above-mentioned range, finishing property is further improved.

(b×c) is 150 to 2500, for example 200 to 2000, for example 250 to 1500. When (b×c) is in the above-mentioned range, finishing property is further improved.

The urethane compound (A) represented by the general formula (1) may be a mixture because normally, a distribution is generated in $(OA)_m$, $(AO)_n$ and the like. When the urethane compound (A) is a mixture, the weight average molecular weight (Mw) of the urethane compound (A) represented by the general formula (1) is for example 5,000 to 20,000, for example 7,000 to 15,000. When the weight average molecular weight (Mw) is in the above-mentioned range, finishing property is further improved. When the molecular weight of the urethane compound (A) is less than 5,000, the finished skin of the obtained coating film may be deteriorated, and when the molecular weight of the urethane compound (A) is more than 20,000, the obtained coating composition may have an excessively high viscosity.

The urethane compound (B) represented by the general formula (2) may be a mixture because normally, a distribution is generated in $(OA)_a$, $(OA)_b$, $(AO)_d$, $[O-C(=O)-NH-Y-NH-C(=O)-(OA)_b]_c$ and the like. When the urethane compound (B) is a mixture, the weight average molecular weight (Mw) of the urethane compound (B) represented by the general formula (2) is for example 20,000 to 100,000, for example 20,000 to 60,000. When weight average molecular weight (Mw) of the urethane compound (B) is in the above-mentioned range, finishing property is further improved. When the molecular weight of the urethane compound (B) is less than 20,000, a sufficient viscosity cannot be obtained, and thus defects such as sagging may occur. On the other hand, when the molecular weight is more than 100,000, the resulting coating composition may have an excessively high viscosity.

The weight average molecular weight (Mw) can be measured by gel permeation chromatography (GPC) using polystyrene having a known molecular weight as a standard substance. For example, the weight average molecular weight (Mw) is measured under the following conditions: a GPC apparatus (model: HLC-8120GPC) manufactured by TOSOH CORPORATION: a column in which two columns (model: SuperH-4000) and one column (model: SuperH-3000) each manufactured by TOSOH CORPORATION are connected in series, a differential refraction detector and a data processor (model: SC-8020) manufactured by TOSOH CORPORATION are used, the column temperature is 40° C., the eluent is THF (extra pure reagent, manufactured by KATAYAMA CHEMICAL, INC.), the flow rate is 0.5 mL/min, the sample concentration is 1% by mass, and the injection amount of a sample solution is 10 µL.

The urethane compound (A) represented by the general formula (1) and the urethane compound (B) represented by the general formula (2) can be synthesized using a known urethanization reaction (see, for example, Japanese Patent Laid-open Publication No. 2000-303006). For example, the urethane compound (A) can be synthesized by reacting a polyether monool and a diisocyanate for 2 to 10 hours. In addition, the urethane compound (B) can be synthesized by reacting a polyether monool, a polyether diol and a diisocyanate for 2 to 10 hours. Some by-products may be formed by the reaction, but the compound can be used as a mixture with by-products.

The content (% by mass) of the urethane compound (A) based on the total mass of the urethane compound (A) and the urethane compound (B) is required to be 5 to 95% by mass, and is for example 10 to 80% by mass, for example 20 to 70% by mass, one example 25 to 65% by mass. When the content of the urethane compound (A) is in the above-mentioned range, finishing property is further improved.

The content (% by mass) of the urethane compound (B) based on the total mass of the urethane compound (A) and the urethane compound (B) may be required to be 5 to 95% by mass, and be for example 10 to 80% by mass, for example 15 to 60% by mass, for one example 17 to 40% by mass. When the content of the urethane compound (B) is in the above-mentioned range, finishing property is further improved.

When the blending amount of the urethane compound (A) is large, the finished skin may be deteriorated. On the other hand, when the blending amount of the urethane compound (B) is large, the resulting coating composition may have an excessively high viscosity.

The viscosity imparting agent to be used for the aqueous intermediate coating composition according to the present disclosure is obtained by uniformly mixing the urethane compound (A) and the urethane compound (B). The method for uniformly mixing the urethane compounds may be a normal method, and it is one embodiment to mix the urethane compounds at about 70 to 150° C. from the viewpoint of mixing efficiency and the like.

The association-type viscosity imparting agent may include an organic solvent and water as necessary. The organic solvent is not particularly limited, and examples thereof include isobutyl alcohol, butyl cellosolve, butyl carbitol and isopropanol. The total content of the organic solvent and water is 10 to 99% by mass based on the total mass.

The association-type viscosity imparting agent is not particularly limited, and examples thereof include ADEKA NOL UH-420, ADEKA NOL UH-462, ADEKA NOL UH-472 and UH-540, ADEKA NOL UH-814N (manufactured by ADEKA Corporation), PRIMAL RH-1020 (manufactured by Rohm and Haas Company) and KURARAY POVAL (manufactured by KURARAY CO., LTD) (each of which is a trade name) as commercially available products. These association-type viscosity imparting agents may be used singly, or used in combination of two or more thereof.

By blending the association-type viscosity imparting agent, the viscosity of the aqueous intermediate coating composition can be increased, so that occurrence of sagging during application of the aqueous intermediate coating composition can be suppressed. In addition, layer mixing between the intermediate coating film and the base coating film can be further suppressed. As a result, as compared with a case where a viscosity imparting agent is not contained, coating workability during coating is further improved, and the resulting coating film can be made to have an excellent finished appearance.

As the association-type viscosity imparting agent, a polyamide-type viscosity modifier may be contained. Examples of the association-type viscosity imparting agent may include BYK-430 and BYK-431 (manufactured by BYK-Chemie GmbH), DISPARLON AQ-580, DISPARLON AQ-600 and DISPARLON AQ-607 (manufactured by Kusumoto Chemicals, Ltd.), and THIXOL W-300 and THIXOL W-400 LP (manufactured by KYOEISHA CHEMICAL Co., LTD.) (each of which is a trade name) as commercially available products.

Other Components

The aqueous intermediate coating composition to be used in the present disclosure may further comprise the following components. These components include, for example, pigment dispersion pastes and other additive components.

Pigment Dispersion Paste

The pigment dispersion paste is obtained by dispersing a pigment and a pigment dispersant in a small amount of an aqueous medium beforehand.

The pigment dispersant is a resin having a structure including a pigment affinity moiety and a hydrophilic moiety. Examples of the pigment affinity moiety and the hydrophilic moiety may include nonionic, cationic and anionic functional groups. The pigment dispersant may have two or more kinds of the above-mentioned functional groups per molecule.

Examples of the nonionic functional group include a hydroxyl group, an amide group and a polyoxyalkylene group. Examples of the cationic functional group include an amino group, an imino group and a hydrazino group. Examples of the anionic functional group include a carboxyl group, a sulfonic acid group and a phosphoric acid group. Such a pigment dispersant can be produced by a method well known to those skilled in the art.

The pigment dispersant is not particularly limited as long as it does not contain a volatile basic substance in the solid content thereof, or has a volatile basic substance content of 3% by mass or less. In one embodiment, a pigment dispersant capable of dispersing a pigment with a small amount is used. For example, commercially available pigment dispersants can also be used (hereinafter, the trade names thereof are listed). Specific examples thereof may include Disperbyk 190, Disperbyk 181, Disperbyk 182 (polymeric copolymer) and Disperbyk 184 (polymeric copolymer) as anionic/nonionic dispersants manufactured by BYK-Chemie GmbH BYK, EFKAPOLYMER 4550 as an anionic/nonionic dispersant manufactured by BASF SE, and SOLSPERSE 27000 as a nonionic dispersant, SOLSPERSE 41000 and SOLSPERSE 53095 as anionic dispersants each of which is manufactured by Avecia Company.

The lower limit and the upper limit of the number average molecular weight of the pigment dispersant are for example, 1000 (lower limit) and 100000 (upper limit), respectively. When the number average molecular weight of the pigment dispersant is less than 1000, dispersion stability may be insufficient, and the number average molecular weight of the pigment dispersant is more than 100000, handling may be difficult because the viscosity may be excessively high. For example, the lower limit and the upper limit of the number average molecular weight are 2000 (lower limit) and 50000 (upper limit), respectively, for example 4000 (lower limit) and 50000 (upper limit), respectively.

The pigment dispersion paste is obtained by mixing and dispersing a pigment dispersant and a pigment in accordance with a known method. The lower limit and the upper limit of the ratio of the pigment dispersant during production of a pigment dispersion paste are for example 1% by mass (lower limit) and 20% by mass (upper limit), respectively, based on the solid content of the pigment dispersion paste. When the ratio of the pigment dispersant is less than 1% by mass, it may be difficult to stably disperse the pigment, and when the ratio of the pigment dispersant is more than 20% by mass, the coating film may have poor physical properties. For example, the lower limit and the upper limit of the ratio of the pigment dispersant are 5% by mass (lower limit) and 15% by mass (upper limit), respectively.

The pigment is not particularly limited as long as it is a pigment that is used for a normal aqueous coating composition, but from the viewpoint of improving weather resistance and securing concealing performance, a color pigment is selected in one embodiment. In particular, titanium dioxide may be selected because it is excellent in color concealing performance, and inexpensive.

Examples of the pigment other than titanium dioxide include organic color pigments such as azo chelate-based pigments, insoluble azo-based pigments, condensed azo-based pigments, phthalocyanine-based pigments, indigo pigments, perinone-based pigments, perylene-based pigments, dioxane-based pigments, quinacridone-based pigments, isoindolinone-based pigments, diketopyrrolopyrroie-based pigments, benzimidazolone-based pigments and metal complex pigments; and inorganic color pigments such as yellow lead, yellow iron oxide, red oxide (bengara) and carbon black. Such a pigment may be used in combination with an extender pigment such as calcium carbonate, barium sulfate, clay or talc.

As a pigment, a standard gray coating composition including carbon black and titanium dioxide as main pigments can also be used. Besides, a coating composition identical in comprising lightness, hue or the like to a top coating composition or a coating composition obtained by comprising various kinds of color pigments can be used.

The ratio of the mass of the pigment to the total mass of the pigment and the solid contents of all resins that are contained in the aqueous intermediate coating composition (PWC: pigment weight content) is for example 10 to 60% by mass. When the ratio of the mass of the pigment (PWC) is less than 10%, concealing performance may be deteriorated. When the ratio of the mass of the pigment (PWC) is more than 60% by mass, the viscosity during curing may be increased, so that flow ability may be reduced, leading to deterioration of the coating film appearance.

The lower limit and the upper limit of the content of the pigment dispersant are for example 0.5% by mass (lower limit) and 10% by mass (upper limit), respectively, based on the mass of the pigment. When the content of the pigment dispersant is less than 0.5% by mass, the dispersion stability of the pigment may be deteriorated because the blending amount of the pigment dispersant is small. When the content of the pigment dispersant is more than 10% by mass, the physical properties of the coating film may be deteriorated. The lower limit and the upper limit of the content of the pigment dispersant are for example 1% by mass (lower limit) and 5% by mass (upper limit), respectively.

Other additives include additives that are normally added in addition to the above-mentioned components, e.g. thickeners, fillers, ultraviolet absorbers, antioxidants, defoaming agents, surface conditioning agents and pinhole inhibitors. The blending amounts of these additives are known to those skilled in the art.

The aqueous intermediate coating composition to be used in the present disclosure is prepared by, for example, mixing an acrylic resin emulsion, a polyester resin, a polyurethane resin, a melamine resin and a film formation auxiliary agent.

For example, the ratio of the acrylic resin emulsion and the polyester resin is 1/1 to 1/20 in terms of a solid content mass ratio (acrylic resin emulsion/hydroxyl group-containing polyester resin). By using the acrylic resin emulsion and the polyester resin at the above-mentioned ratio, an increase in viscosity of the coating film can be suppressed, and favorable smoothness is imparted to the intermediate coating film, leading to attainment of an excellent appearance. Further, the water absorption ratio and the elution ratio can be reduced.

The pigment dispersion paste and other additives may be mixed in an appropriate amount. However, in one embodiment, additional resin components are blended in an amount of 50 parts by mass or less based on 100 parts by mass of the solid content of all resins contained in the aqueous intermediate coating composition. It is not preferable that the additional resin components are added in an amount of more than 50 parts by mass because it is difficult to increase the solid content concentration in the coating composition.

For the order of adding these components, the components may be added before or after addition of the curing agent to the acrylic resin emulsion. The state of the aqueous intermediate coating composition is not particularly limited as long as it is aqueous. The aqueous intermediate coating composition may be in the state of, for example, an aqueous solution, an aqueous dispersion or an aqueous emulsion.

Aqueous Base Coating Composition

The aqueous base coating composition to be used in the method of the present disclosure may be a coating composition that is normally used as an aqueous base coating composition for automobile bodies. Examples of the aqueous base coating composition may include those containing a coating film forming resin, a curing agent, a pigment such as a bright pigment, a color pigment or an extender pigment, various kinds of additives, and so on, which are dispersed or dissolved in an aqueous medium. As the base coating film forming resin, for example, a polyester resin, an acrylic resin, a urethane resin, a carbonate resin, an epoxy resin and the like can be used. From the viewpoint of pigment dispersibility and workability, a combination of an acrylic resin and/or a polyester resin with a melamine resin is selected in one embodiment. As the curing agent, pigment and various additives, those that are normally used can be used.

The lower limit and the upper limit of the concentration of a pigment (PWC) contained in the aqueous base coating composition is generally 1% by mass (lower limit) and 60% by mass (upper limit), for example 2% by mass (lower limit) and 55% by mass (upper limit), for example 3% by mass (lower limit) and 55% by mass (upper limit), respectively. When the pigment concentration is less than 1% by mass, an effect by the pigment cannot be obtained, and when the pigment concentration is more than 60% by mass, the appearance of the resulting coating film may be deteriorated.

The aqueous base coating composition can be prepared by the same method as in the case of the intermediate coating composition. In addition, the state of the aqueous base coating composition is not particularly limited as long as it is aqueous. The aqueous base coating composition may be in the state of, for example, an aqueous solution, an aqueous dispersion or an aqueous emulsion.

Clear Coating Composition

The clear coating composition to be used in the method of the present disclosure may be a coating composition that is normally used as a clear coating composition for automobile bodies. Examples of the clear coating composition may include those containing a coating film forming resin, a curing agent and other additives, which are dispersed or dissolved in an aqueous medium. Examples of the coating film forming resin include acrylic resins, polyester resins, epoxy resins and urethane resins. Such a resin may be used in combination with a curing agent such as an amino resin and/or an isocyanate resin. From the viewpoint of transparency, acid-resistant etching property, or the like, in one embodiment to use, for example, a combination of an acrylic resin and/or a polyester resin with an amino resin, or an acrylic resin and/or a polyester resin which has a carboxylic acid/epoxy curing system.

The coating material of the clear coating composition may be in the type of any of an organic solvent type, an aqueous material type (aqueous solution type, aqueous dispersion type or emulsion type), a nonaqueous dispersion type and a powder type, and as necessary, the clear coating composition may contain a curing catalyst, a surface conditioning agent and so on.

Chipping-Resistant Coating Film Forming Composition

For example, for preventing a so-called chipping phenomenon in which the coating film is peeled off due to collision of pebbles and gravel bounced up by a tire during running of an automobile, an automobile body may have a chipping-resistant coating film on a surface of an electrodeposition coating film.

In a certain aspect, the chipping-resistant coating film is formed on a rocker portion of an automobile body. In a rocker portion, in particular, a chipping phenomenon easily occurs, so that a stronger chipping-resistant coating film is required, and therefore a chipping-resistant coating film including a vinyl chloride-based resin is selected in one embodiment. Such a chipping-resistant coating film can be formed from a chipping-resistant coating film forming composition containing a vinyl chloride-based resin.

The intermediate coating composition according to the present disclosure is capable of forming a coating film while following thermal shrinkage/thermal expansion of the chipping-resistant coating film, so that the appearance of the coating film can be kept smooth, and excellent coating film strength can be obtained.

Examples of the vinyl chloride resin that may be contained in the chipping-resistant coating film forming composition include homopolymers of vinyl chloride, and copolymers of vinyl chloride and other monomers such as vinyl acetate. These homopolymers and copolymers of vinyl chloride may be used in combination.

Examples of the plasticizer that may be contained in the chipping-resistant coating film forming composition include phthalic acid esters such as dioctyl phthalate, di-2-ethylhexyl phthalate, diisononyl phthalate and octylbutyl phthalate; di- or tricarboxylic acid esters such as sebacic acid esters and azelaic acid esters; phosphoric acid esters such as triphenyl phosphate and tricresyl phosphate; and epoxy-based plasticizers such as epoxidized soybean oil. As the plasticizer, a high-boiling-point organic solvent can also be used.

In one embodiment, plasticizers include at least one of phthalic acid esters, sebacic acid esters and azelaic acid esters. By using such a plasticizer, more favorable chipping resistance can be obtained.

The addition amount of the plasticizer can be appropriately adjusted according to a film thickness of the chipping-resistant coating film, required physical properties, and the like.

The chipping-resistant coating film forming composition may contain a filler such as a carbonate or sulfate of an alkaline earth metal, mica, silica, talc, diatomaceous earth or kaolin, a general adhesion imparting agent such as an epoxy-based, acryl-based, polyamide-based or isocyanate-based adhesin imparting agent, a stabilizer such as a salt of a metal such as zinc, lead, barium, tin or calcium, a thixotropy imparting agent such as surface-treated calcium carbonate or an ultrafine particle silica powder, and the like.

Method for Forming Multilayer Coating Film

In a method for forming a multilayer coating film according to the present disclosure, first an automobile body provided with an electrodeposition coating film is provided. The electrodeposition coating film is formed by applying an electrodeposition coating composition to an automobile body and baking and curing the electrodeposition coating composition. The automobile body as an object to be coated is not particularly limited as long as it is a metallic product which can be subjected to cationic electrodeposition coating. Examples of the metal that forms the automobile body may include iron, copper, aluminum, tin, zinc and alloys containing these metals.

The electrodeposition coating composition is not particularly limited, and a known cationic electrodeposition coating composition or anionic electrodeposition coating composition can be used. Electrodeposition coating and baking may be performed in accordance with a method and conditions which are normally used for electrodeposition coating of an automobile body.

In a certain aspect, a chipping-resistant coating film forming composition is applied onto an electrodeposition coating film to form a chipping-resistant coating film. For coating of the chipping-resistant coating film forming composition, airless spray coating capable of forming a thick film in a short time is most suitable when a thickness of a target coating film is to be achieved. This airless spray coating also includes improved electrostatic airless spray coating and air assist airless spray coating. It is also possible to perform coating by a computer-controlled automatic coating machine or a robotic coating machine.

The coating amount is adjusted so that the thickness of a cured coating film may be 100 to 500 µm, for example 150 to 350 µm. When the thickness is less than 100 µm, the appearance and chipping resistance of the obtained coating film may be deteriorated, and when the thickness is more than 500 µm, defects such as sagging during coating and generation of pinholes during baking and curing may occur.

In addition, by curing the coating film under heating and curing conditions that are generally used, a chipping-resistant coating film can be formed on an object to be coated, e.g. an electrodeposition coating film.

An aqueous intermediate coating composition is then applied onto an automobile body provided with an electrodeposition coating film, or an automobile body with a chipping-resistant coating film formed on an electrodeposition coating film in a certain aspect.

The intermediate coating composition can be applied by spraying the composition using, for example, an air electrostatic spray which is commonly referred to as "React Gun", or a rotary atomization-type electrostatic coating machine which is commonly referred to as "micro/micro bell (µµ bell)", "micro bell (µ bell)", "metallic bell (meta-bell)" or the like.

The coating amount is adjusted so that the thickness of a cured coating film may be 10 to 40 µm, for example 15 to 30 µm. When the thickness is less than 10 µm, the appearance and chipping resistance of the obtained coating film may be deteriorated, and when the thickness is more than 40 µm, defects such as sagging during coating and generation of pinholes during baking and curing may occur.

The applied intermediate coating composition is preheated (pre-dried) by heating or air blasting before the aqueous base coating composition is applied. In this specification, the "preheating" means that the applied coating composition is heated and dried under conditions of a temperature and a time which do not cause curing. By performing preheating, a coating film having a smooth appearance can be formed without causing the problem that water remaining in the coating film suddenly boils in a step of baking a multilayer coating film, leading to occurrence of foaming.

In addition, even when an aqueous base coating composition is applied immediately after an uncured intermediate coating film is formed, mixing of these two coating film layers (layer mixing) can be avoided by performing preheating. Thus, an extremely excellent coating film appearance can be imparted to the resulting multilayer coating film.

Further, according to the present disclosure, sagging of the aqueous intermediate coating composition can be effectively prevented by preheating the aqueous intermediate coating composition under the conditions according to the present disclosure.

In the method of the present disclosure, the applied intermediate coating composition is preheated at 60 to 90° C., for example 70 to 90° C., for 3 to 10 minutes.

The intermediate coating composition is preheated to form an uncured intermediate coating film, an aqueous base coating composition is applied onto the uncured intermediate coating film, and preheated to form an uncured base coating film, and a clear coating composition is applied onto the uncured base coating film by wet-on-wet coating to form an uncured clear coating film. In the present disclosure, the wet-on-wet coating means that a plurality of coating films are applied one after another while the coating films are pre-dried (preheated) without being cured.

The coating amount of the aqueous base coating composition is normally adjusted so that the thickness after curing of the coating film may be 10 to 20 µm. When the thickness after curing is less than 10 µm, concealment of a base may be insufficient, or color unevenness may occur, and when the thickness after curing is more than 20 µm, sagging may occur during coating, or pinholes may be generated during heating and curing.

After the aqueous base coating composition is applied, preheating is performed at 60 to 90° C., for example 70 to 90° C., for 3 to 10 minutes.

Even when a clear coating composition is applied immediately after an uncured base coating film is formed, mixing of these two coating film layers (layer mixing) can be avoided by performing preheating. Thus, an extremely excellent coating film appearance can be imparted to the obtained multilayer coating film.

Further, according to the present disclosure, sagging of the aqueous base coating composition can be effectively prevented by preheating the aqueous base coating composition under the conditions according to the present disclosure.

The coating amount of the clear coating composition is normally adjusted so that the thickness after drying and curing of the coating film is 15 to 60 µm. When the thickness after curing is less than 15 µm, the appearance properties such as a glossy feeling, of the multilayer coating film may be deteriorated, and when the thickness after curing is more than 60 µm, image clearness is deteriorated, and/or defects such as unevenness and flowing occur during coating.

The uncured intermediate coating film, uncured base coating film and uncured clear coating film are then baked and cured at a time. Baking is performed by heating the coating films to a temperature of normally 120 to 160° C., for example 130 to 160° C. Accordingly, a cured coating film having a high degree of crosslinking can be obtained. When the heating temperature is lower than 120° C., curing tends to be insufficient, and when the heating temperature is higher than 160° C., the obtained coating film may be hard and brittle. The heating time can be appropriately set according to the above-mentioned temperature, and is, for example, 10 to 60 minutes when the temperature is 130 to 160° C.

EXAMPLES

Hereinafter, the present disclosure will be described further in detail by way of examples, but the present disclosure is not limited to these examples. In examples, the "part(s)" means "part(s) by mass" unless otherwise specified.

Aqueous Intermediate Coating Composition

Production Examples 1 to 5: Preparation of Hydroxyl Group-Containing Acrylic Resin Emulsion 445 parts of water and 5 parts of Newcol 293 (manufactured by Nippon Nyukazai Co., Ltd.) were added in a normal acryl-based resin emulsion producing reaction vessel equipped with a stirrer, a thermometer, a dropping funnel, a reflux condenser and a nitrogen inlet pipe, and the mixture was heated to 75° C. while being stirred. A mixture of 24.6 parts of a monomer mixture as shown in Table 1, 240 parts of water and 30 parts of Newcol 293 (manufactured by Nippon Nyukazai Co., Ltd.) was emulsified using a homogenizer, and the resulting monomer pre-emulsified liquid was dropped into the reaction vessel for 3 hours while being stirred. While the monomer pre-emulsified liquid was dropped, an aqueous solution obtained by dissolving 1 part of APS (ammonium persulfate) as a polymerization initiator in 50 parts of water was evenly dropped into the reaction vessel until completion of dropping of the monomer pre-emulsified liquid. After completion of dropping of the monomer pre-emulsified liquid, the reaction was further continued at 80° C. for 1 hour, followed by cooling the mixture. After cooling, an aqueous solution obtained by dissolving 2 parts of dimethylaminoethanol in 20 parts of water was added to obtain a hydroxyl group-containing acrylic resin emulsion having a nonvolatile component content of 40.6% by mass (Em 1 to Em 5). The pH of the acrylic resin emulsion was adjusted to 7.2 using a 30% dimethylaminoethanol aqueous solution.

TABLE 1

| No. | Production Example 1 | Production Example 2 | Production Example 3 | Production Example 4 | Production Example 5 |
|---|---|---|---|---|---|
| | Em1 | Em2 | Em3 | Em4 | Em5 |
| ST (styrene) | 5 | 5 | 5 | 5 | 5 |
| EHA (2-ethylhexyl acrylate) | 78.11 | 30 | 20.54 | 37.62 | 0 |
| TBMA (t-butyl methacrylate) | 0 | 0 | 0 | 0 | 17.4 |
| EHMA (2-ethylhexyl methacrylate) | 0 | 48.11 | 71.5 | 28.9 | 60.71 |
| HEMA (hydroxyethyl methacrylate) | 16.25 | 16.25 | 2.32 | 27.84 | 16.25 |
| AA (acrylic acid) | 0.64 | 0.64 | 0.64 | 0.64 | 0.64 |
| Total | 100.00 | 100.00 | 100.00 | 100.00 | 100.00 |
| Acrylic resin Glass transition temperature Tg (° C.) | −50 | −20 | −20 | −20 | 20 |
| Acrylic resin Acid value (mg KOH/g) | 5 | 5 | 5 | 5 | 5 |
| Acrylic resin Hydroxyl value (mg KOH/g) | 70 | 70 | 10 | 120 | 70 |

St: styrene
EHA: 2-ethylhexyl acrylate
TBMA: t-butyl methacrylate
EHMA: 2-ethylhexyl methacrylate
HEMA: hydroxyethyl methacrylate
AA: acrylic acid The glass transition temperatures (Tg), hydroxyl values (OHV) and acid values (AV) of the acrylic resin emulsions (Em 1 to Em 5) prepared in Production Examples 1 to 5 are shown in Table 1. The glass transition temperature (Tg), the hydroxyl value (OHV) and the acid value (AV) are determined by calculation from the amounts of various kinds of unsaturated monomers used in for synthesis.

Production Example 6: Preparation of Hydroxyl Group-Containing Polyester Resin 25.6 parts of isophthalic acid, 22.8 parts of phthalic anhydride, 5.6 parts of adipic acid, 19.3 parts of trimethylolpropane, 26.7 parts of neopentyl glycol, 17.5 parts of ε-caprolactone and 0.1 part of dibutyltin oxide were added in a reactor, and the mixture was heated to 170° C. while being mixed and stirred. Thereafter, while the mixture was heated to 220° C. over 3 hours, water generated by a condensation reaction was removed until the acid value was 8 mg KOH/g. 7.9 parts of trimellitic anhydride was then added, and the mixture was reacted at 150° C. for 1 hour to obtain a polyester resin having an acid value of 40 mg KOH/g. Further, the polyester resin was cooled to 100° C., 11.2 parts of butyl cellosolve was then added, the mixture was stirred until being homogeneous, and then cooled to 60° C., and 98.8 parts of ion-exchanged water and 5.9 parts of dimethylethanolamine were then added to obtain a hydroxyl group-containing polyester resin having a solid content of 50% by mass, a solid acid value of 40 mg KOH/g, a hydroxyl value of 110 mg KOH/g, a number average molecular weight of 2870 and a glass transition temperature (Tg) of −3° C. The glass transition temperature (Tg) of the hydroxyl group-containing polyester resin is determined by calculation from the blending amounts of various kinds of monomers used for synthesis.

Production Example 7: Preparation of Carbodiimide Compound 3,930 parts of 4,4-dicyclohexylmethane diisocyanate was reacted together with 79 parts of 3-methyl-1-phenyl-2-phospholene-1-oxide as a carbodiimidization catalyst at 180° C. for 16 hours to obtain a carbodiimide compound having four carbodiimide groups per molecule, and isocyanate groups at both terminals. Thereto were added 1,296 parts of polyethylene glycol monomethyl ether having 9 oxyethylene group repeating units on average and 2 parts of dibutyltin dilaurate, and the mixture was heated at 90° C. for 2 hours to obtain a carbodiimide compound having an isocyanate group and a hydrophilic group at terminals. Next, 3000 parts of GP-3000 (manufactured by Sanyo Chemical Industries, Ltd.) having a structure in which 16.7 moles of propylene oxide corresponding to an $OR^1$ group is added to each of three hydroxyl groups of glycerin on average, and the mixture was reacted at 90° C. for 6 hours. It was confirmed by IR that the isocyanate group of the reaction product disappeared. Thereto was added 18,800 parts of deionized water, and the mixture was stirred to obtain a carbodiimide compound aqueous dispersion having a resin solid content of 30% by mass.

Production Example 8: Preparation of Pigment Dispersion Paste 4.5 parts of a commercially available dispersant "Disperbyk 190" (trade name) (anionic/nonionic dispersant manufactured by BYK-Chemie GmbH), and 0.5 parts of a defoaming agent "BYK-011" (defoaming agent manufactured by BYK-Chemie GmbH), 22.9 parts of ion-exchanged water and 72.1 parts of rutile titanium dioxide were preliminarily mixed, a glass bead medium was then added in a paint conditioner, and the mixture was mixed and dispersed at room temperature until the particle size was 5 µm or less, thereby a pigment dispersion paste was obtained.

Polyurethane Resin

"PERMALIN UA-150" (manufactured by Sanyo Chemical Industries, Ltd.) as a polyether-based urethane emulsion (resin solid content: 30% by mass) was used.

Melamine Resin

"CYMEL 211" (manufactured by ALLNEX Japan K.K.) as an imino-type melamine resin was used.

Polycarbonate Resin

"DURANOL T5650E" (manufactured by Asahi Kasei Corporation) as a polycarbonate diol was used.

Film Formation Auxiliary Agent

"ADEKA PLANON MPC-589" (manufactured by ADEKA Corporation, boiling point: 290° C.) was used as a film formation auxiliary agent.

The boiling point was measured in accordance with an equilibrium reflux boiling point test method as specified in JIS K 2233 (2006).

Example 1: Formation of Multilayer Coating Film

Preparation of Aqueous Intermediate Coating Composition 30 parts by mass of the hydroxyl group-containing acrylic resin emulsion (Em 1) prepared in Production Example 1, 10 parts by mass of the hydroxyl group-containing polyester resin prepared in Production Example 6, 25 parts by mass of a polyurethane resin "PERMALIN UA-150", 19 parts by mass of a melamine resin "CYMEL 211" as a curing agent, 8 parts by mass of a polycarbonate resin "DURANOL T5650E", 8 parts by mass of the carbodiimide resin prepared in Production Example 7, and 50 parts by mass of the pigment dispersion paste prepared in Production Example 8 were mixed, 0.08 parts by mass of ADEKA NOL UH-814N (urethane association-type viscosity imparting agent, active ingredient: 30%, manufactured by ADEKA Corporation) and 11.67 parts by mass of "ADEKA PLANON MPC-589" as a film formation auxiliary agent were then mixed, and the mixture was stirred to obtain an aqueous intermediate coating composition.

Formation of Multilayer Coating Film

A dull steel sheet treated with zinc phosphate was subjected to electrodeposition coating with POWERNICS 1010 (trade name) (cationic electrodeposition coating material manufactured by NIPPON PAINT AUTOMOTIVE COATINGS CO., LTD.) in such a manner that the dry coating film had a thickness of 15 µm, and the applied coating material was heated and cured at 170° C. for 30 minutes, and then cooled to provide a steel sheet substrate.

A chipping-resistant coating film forming composition containing diisononyl phthalate (DINP) as a plasticizer and a vinyl chloride-based resin was then applied to the electrodeposition-coated surface of the steel sheet substrate so as to have a thickness of 25 µm after curing, and baked and cured at 140° C. for 14 minutes to form a chipping-resistant coating film.

An aqueous intermediate coating composition prepared as described above was applied to the steel sheet substrate having a chipping-resistant coating film to a thickness of 20 µm by air spray coating, and preheated at 80° C. for 3 minutes, and AQUAREX AR-3020 Silver Metallic (trade name) (aqueous metallic base coating material manufactured by NIPPON PAINT AUTOMOTIVE COATINGS CO., LTD.) was then applied by air spray coating to a thickness of 10 μm, and preheated at 80° C. for 3 minutes. Further, MACFLOW O-1860 Clear (trade name) (acid epoxy-curable type clear coating material manufactured by NIPPON PAINT AUTOMOTIVE COATINGS CO., LTD.) as a clear coating composition was applied to the coated sheet to a thickness of 10 μm by air spray coating, and then heated and cured at 140° C. for 30 minutes to obtain a test piece.

The finished appearance of a multilayer coating film obtained after heating and curing was visually evaluated in accordance with the following evaluation criteria. The results are shown in Table 2 below. The aqueous intermediate coating composition, aqueous base coating composition and clear coating composition were diluted under the following conditions, and used for coating.

Aqueous Intermediate Coating Composition
Thinner: ion-exchanged water
900 mPa·s/6 rpm/B-type viscometer
The coating material solid content was 48% by mass.
Aqueous Base Coating Composition
Thinner: ion-exchanged water
3000 mPa·s/6 rpm/B-type viscometer
Clear Coating Composition
Thinner: mixed solvent of EEP (ethoxyethyl propionate)/S-150 (trade name) (aromatic hydrocarbon solvent manufactured by Exxon Company)=1/1 (mass ratio)
30 seconds/NO. 4 Ford Cup/20° C.

Examples 2 to 5 and Comparative Examples 1 to 4

An aqueous intermediate coating composition was prepared with components and amounts as shown in Table 2 below, and a multilayer coating film was formed in the same manner as in Example 1 (Examples 2 to 5 and Comparative Examples 1 to 4). The evaluation results are shown in Table 2 below.

TABLE 2

| Aqueous intermediate coating material | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| (a) Acrylic resin emulsion/ | Em1 | Em2 | Em3 | Em4 | Em5 | Em2 | Em2 | Em2 | Em2 |
| (solid content, parts by mass) | 30 | 30 | 30 | 30 | 30 | 30 | 30 | 30 | 30 |
| Polyester resin (parts by mass) | Production Example 6 | Production Example 6 | Production Example 6 | Production Example 6 | Production Example 6 | Production Example 6 | Production Example 6 | Production Example 6 | Production Example 6 |
|  | 10 | 10 | 10 | 10 | 10 | 10 | 10 | 10 | 10 |
| Polyurethane resin (parts by mass) | 25 | 25 | 25 | 25 | 25 | 25 | 25 | 25 | 25 |
| Melamine resin (parts by mass) | 19 | 19 | 19 | 19 | 19 | 19 | 19 | 19 | 19 |
| Polycarbonate resin (parts by mass) | 8 | 8 | 8 | 8 | 8 | 8 | 8 | 8 | 8 |
| Carbodiimide resin (parts by mass) | 8 | 8 | 8 | 8 | 8 | 8 | 8 | 8 | 8 |
| Total resin solid content (parts by mass) | 100 | 100 | 100 | 100 | 100 | 100 | 100 | 100 | 100 |
| (b) Film formation auxiliary agent upper column: boiling point | 290° C. | 290° C. | 290° C. | 290° C. | 290° C. | — | 277° C. | 250° C. | 290° C. |
| lower column: (parts by mass) | 12 | 12 | 12 | 12 | 12 |  | 12 | 12 | 12 |
| Preheating of aqueous intermediate coating composition and base coating composition | Done | Done | Done | Done | Done | Done | Done | Done | Not done |
| Rupture elongation (%) of cured film deposited at a ratio of 3:1 in terms of a mass ratio of solid content of (a)/(b) | 4.9% | 4.1% | 4.3% | 3.8% | 3.0% | — | 4.3% | 4.5% | 4.5% |
| Film breakage on chipping-resistant coating film | ○ | ○ | ○ | ○ | ○ | X | X | X | ○ |
| Appearance of coating film on chipping-resistant coating film (creases) | ○ | ○ | ○ | ○ | ○ | X | X | X | ○ |
| Appearance of coating film in the absence of chipping-resistant coating film (gloss) | ○ | ○ | ○ | ○ | ○ | ○ | ○ | ○ | X |
| Sagging | ○ | ○ | ○ | ○ | ○ | ○ | ○ | ○ | X |

Measurement of Rupture Elongation

The rupture elongation was measured with a cured film (test piece size: 40×5×0.03 mm) obtained by mixing (a) an acrylic resin emulsion and (b) a film formation auxiliary agent at a ratio of 3:1 in terms of a mass ratio of the solid content of the (a) acrylic resin emulsion and the (b) film formation auxiliary agent. Using an EZ tester (manufactured by Shimadzu Corporation), tensile property was measured. The distance between chucks was set to 20 mm, the test piece was stretched under the condition of 20° C. and 4 mm/min, and the rupture elongation was measured.

Evaluation of Film Breakage on Object to be Coated (Chipping-Resistant Coating Film)

◯: the multilayer coating film did not have defects such as cracks.

x: the multilayer coating film had defects such as cracks.

Evaluation Appearance on Object to be Coated (Chipping-Resistant Coating Film)

◯: a smooth multilayer coating film was obtained.

x: the multilayer coating film had creases, and thus it was not possible to obtain a smooth multilayer coating film.

Evaluation Appearance on Object to be Coated (No Chipping-Resistant Coating Film)

Except that a chipping-resistant coating film was not formed on the above-mentioned steel sheet substrate, the same procedure as described above was carried out to form a multilayer coating film, and the appearance was evaluated.

◯: the coating film did not have appearance defects such as abnormal glossiness due to layer mixing.

x: abnormal glossiness occurred due to layer mixing, so that the coating film had appearance defects.

Evaluation of Sagging

A coating sheet having a hole with a diameter of 10 mm was coated with an aqueous intermediate coating composition, AQUAREX AR-3020 Silver Metallic (trade name) (aqueous metallic base coating material manufactured by NIPPON PAINT AUTOMOTIVE COATINGS CO., LTD.) and MACFLOW O-1860 Clear (trade name) (acid epoxy-curable clear coating material manufactured by NIPPON PAINT AUTOMOTIVE COATINGS CO., LTD.) sequentially under the following robot coating conditions, and set perpendicularly, and the coating film was heated and cured while being kept perpendicular. The length of sagging (sagging length) of the formed coating composition was measured from the edge portion of the hole (on the lower side in a perpendicular direction).

Robot Painting Conditions
(Aqueous Intermediate Coating Composition)
Temperature: 23° C.
Humidity: 68%
Model: ABB Cartridge Bell
Linear speed: 600 mm/s
Rotation speed: 25000 rpm
Shaving air pressure: 0.13 MPa/cm$^3$
Applied voltage: −80 KV
Thickness: 30 m
Setting time: 3 minutes
Preheating: at 80° C. for 3 minutes
(AQUAREX AR-3020 Silver Metallic)
Temperature: 23° C.
Humidity: 68%
Model: ABB Cartridge Bell
Linear speed: 600 mm/s
Rotation speed: 30000 rpm
Shaving air pressure: 0.20 MPa/cm$^3$
Applied voltage: −90 KV
Thickness: 15 μm
Setting time: 3 minutes
Preheating: at 80° C. for 3 minutes
(MACFLOW O-1860 Clear)
Temperature: 23° C.
Humidity: 68%
Model: ABB Cartridge Bell
Linear speed: 600 mm/s
Rotation speed: 20000 rpm
Shaving air pressure: 0.15 MPa/cm$^3$
Applied voltage: −80 KV
Film Thickness: 35 μm
Setting time: 7 minutes
Heating and curing: at 140° C. for 30 minutes
Evaluation Criteria for Sagging
◯: The sagging length is less than 5 mm.
x: The sagging length is 5 mm or more.

Comparative Example 4

Using an aqueous intermediate coating having the same composition as in Example 2, a multilayer coating film was formed without preheating the aqueous intermediate coating composition and a base coating composition. As a result, layer mixing with the aqueous base coating material occurred, so that the coating film had coating film appearance defects such as occurrence of abnormal glossiness. In addition, sagging was evaluated in the same manner as described above, and the result showed that the sagging length was 9 mm or more.

Example 6

Except that a chipping-resistant coating film was not formed, the same procedure as in Example 1 was carried out to form a multilayer coating film. The rupture elongation was 4.9%. Film breakage caused by cracks etc. on the object to be coated did not occur, and coating film appearance defects due to creases did not occur on the object to be coated. Further, either abnormal glossiness due to layer mixing or sagging did not occur.

With the method for forming a multilayer coating film according to the present disclosure, the softness of a coating film can be maintained to obtain a smooth coating film even on a thermally expandable/shrinkable base in a process for forming a multilayer coating film, and thus a multilayer coating film having an excellent coating film appearance can be obtained. In addition, according to the present disclosure, sagging of an aqueous intermediate coating composition and an aqueous base coating composition can be effectively prevented.

On the other hand, in Comparative Example 1, the film formation auxiliary agent according to the present disclosure was not present, and the aqueous intermediate coating film suffered film breakage on the coated film, and coating film appearance defects.

In Comparative Examples 2 and 3, the boiling point of the film formation auxiliary agent was outside the range according to the present disclosure, and the aqueous intermediate coating film suffered film breakage on the coated film, and coating film appearance defects.

Comparative Example 4 was a comparative example in which the aqueous intermediate coating composition and the base coating composition were not preheated. In Comparative Example 4, sagging occurred.

According to the present disclosure, there is provided a method for forming a multilayer coating film, the method being capable of forming a smooth coating film even on a thermally expandable/shrinkable base when a multilayer coating film including an intermediate coating film, a base coating film and a clear coating film is formed on an automobile body provided with an electrodeposition coating film using a three-coating and one-baking method.

What is claimed is:

1. A method for forming a multilayer coating film on an automobile body, wherein the method comprises the steps of:

prov6iding the automobile body with an electrodeposition coating film;

applying an aqueous intermediate coating composition onto the electrodeposition coating film;

preheating the applied aqueous intermediate coating composition at 60 to 90° C. for 3 to 10 minutes to form an uncured intermediate coating film;

applying an aqueous base coating composition onto the uncured intermediate coating film;

preheating the applied aqueous base coating composition at 60 to 90° C. for 3 to 10 minutes to form an uncured base coating film; and applying a clear coating composition onto the uncured base coating film to form an uncured clear coating film; and baking and curing the uncured intermediate coating film, base coating film and clear coating film at a time to form the multilayer coating film, wherein the aqueous intermediate coating composition comprises a coating film forming resin, the coating film forming resin comprises (a) an acrylic resin emulsion having a glass transition temperature of −50 to 20° C., an acid value of 2 to 60 mg KOH/g and a hydroxyl value of 10 to 120 mg KOH/g, the resin solid content of the acrylic resin emulsion is 20 to 50 parts by mass based on 100 parts by mass of the total resin content of the coating film forming resin, and the aqueous intermediate coating composition comprises (b) a film formation auxiliary agent that is a fatty acid diester compound having a boiling point of 280° C. or higher and 350° C. or lower, wherein a blending amount of the film formation auxiliary agent is 2 to 30 parts by mass based on 100 parts by mass of the total resin solid content of the coating film forming resin, wherein a cured film for measuring a rupture elongation is obtained from a mixture containing the acrylic resin emulsion and the film formation auxiliary agent at a ratio of 3:1 in terms of a mass ratio of the solid content of the acrylic resin emulsion and the film formation auxiliary agent and the cured film has a rupture elongation of 1% or more, wherein the fatty acid diester compound is a compound prepared from a starting material containing an aliphatic dicarboxylic acid, and an alcohol, the aliphatic dicarboxylic acid is one or more selected from the group consisting of butanedioic acid, pentanedioic acid, hexanedioic acid, heptanedioic acid, octanedioic acid, nonanedioic acid, decanedioic acid, undecanedioic acid and dodecanedioic acid, and the alcohol is one or more selected from the group of linear aliphatic saturated alcohols having 1 to 10 carbon atoms, and branched aliphatic saturated alcohols having 3 to 10 carbon atoms, wherein the linear aliphatic saturated alcohol having 1 to 10 carbon atoms is methanol, ethanol, n-propanol, n-butanol, n-pentanol, n-hexanol, n-heptanol, n-octanol, n-decanol, n-undecanol or n-dodecanol, and the branched aliphatic saturated alcohol having 3 to 10 carbon atoms is 2-propanol, 2-methyl-1-propanol, 2-butanol, 2-methyl-2-propanol, 3-methyl-1-butanol, 2-pentanol, 3-pentanol, 2-methyl-1-butanol, 2-methyl-2-butanol, 3-methyl-2-butanol, 2,2-dimethyl-1-propanol, 4-methyl-1-pentanol, 2-hexanol, 3-hexanol, 2-methyl-1-pentanol, 2-ethyl-1-butanol, 5-methyl-1-hexanol, 2-heptanol, 3-heptanol, 4-heptanol, 2-methyl-1-hexanol, 2-methyl-3-hexanol, 2-ethyl-1-pentanol, 6-methyl-1-heptanol, 2-octanol, 3-octanol, 2-methyl-1-heptanol, 2-ethyl-1-hexanol, 7-methyl-1-octanol, 2-nonanol, 3-nonanol, 2-methyl-1-octanol, 3-methyl-1-octanol, 4-methyl-1-octanol, 5-methyl-1-octanol, 6-methyl-1-octanol, 2-ethyl-1-heptanol, 2,4-dimethyl-1-heptanol, 2,5-dimethyl-1-heptanol, 4,6-dimethyl-1-heptanol, 2,6-dimethyl-4-heptanol, 3,5,5-trimethyl-1-hexanol, 2,5,5-trimethyl-1-hexanol, 8-methyl-1-nonanol, 2-decanol, 3-decanol, 2-methyl-1-nonanol, 2-ethyl-1-octanol, 2-propyl-1-heptanol, 2,7-dimethyl-1-octanol, 2,6-dimethyl-2-octanol, 2,4-dimethyl-1-octanol, 3,7-dimethyl-1-octanol, 3,6-dimethyl-3-octanol, 4-methyl-2-propyl-1-hexanol, 5-methyl-2-propyl-1-hexanol, 2-(1-methylethyl)-4-methyl-1-hexanol or 2-(1-methylethyl)-5-methyl-1-hexanol.

2. The method for forming a multilayer coating film according to claim 1, wherein the automobile body is an automobile body in which a chipping-resistant coating film including a vinyl chloride-based resin is formed on the electrodeposition coating film.

* * * * *